United States Patent [19]
Davenport

[11] Patent Number: 6,045,070
[45] Date of Patent: *Apr. 4, 2000

[54] MATERIALS SIZE REDUCTION SYSTEMS AND PROCESS

[76] Inventor: Ricky W. Davenport, P.O. Box 52154, Lafayette, La. 70505-2154

[*] Notice: This patent is subject to a terminal disclaimer.

[21] Appl. No.: 09/139,074

[22] Filed: Aug. 24, 1998

Related U.S. Application Data

[63] Continuation-in-part of application No. 08/897,296, Jul. 21, 1997, and application No. 08/802,848, Feb. 19, 1997, and application No. 09/023,051, Feb. 13, 1998.

[51] Int. Cl.[7] .................................................. B02C 19/12
[52] U.S. Cl. ............................ 241/60; 175/206; 241/81; 241/101.8; 241/152.2
[58] Field of Search .............................. 175/206; 241/34, 241/21, 101.8, 29, 46.11, 152.2, 46.17, DIG. 31, 606, 79.1, 244, 60, 81

[56] References Cited

U.S. PATENT DOCUMENTS

| | | | |
|---|---|---|---|
| 4,449,670 | 5/1984 | Tloczynski et al. | 241/101.8 |
| 4,482,095 | 11/1984 | Danforth | 241/46.11 |
| 4,725,336 | 2/1988 | Fisher | 241/244 |
| 5,129,469 | 7/1992 | Jackson | 175/206 |
| 5,361,998 | 11/1994 | Sirevag et al. | 241/101.8 |
| 5,451,376 | 9/1995 | Proksa et al. | 241/101.8 |
| 5,495,986 | 3/1996 | Davenport . | |
| 5,586,729 | 12/1996 | Davenport . | |

*Primary Examiner*—Mark Rosenbaum
*Attorney, Agent, or Firm*—Robert N. Montgomery

[57] ABSTRACT

A series of solids size reduction systems utilizing variable displacement rotary dispersion and in-line grinder apparatus. The systems include in-feed, and receiving and mixing systems for blending solids with a carrier fluid. The systems include force feeding of the solids and carrier fluids to the grinding apparatus as well as separation and recover of the carrier fluids for recycling. The systems further include pre-shredding and metal removal apparatus. Systems are also disclosed which provide for recovery of ferrous and nonferrous metals, separation of hi/low density solids and further provides for the palletizing of separation solids. Systems and processes are disclosed for the reduction of whole tires or strips and chips to granulated rubber, the portable processing of raw sugar cane, and the processing of drill cuttings for injecting into a well head.

28 Claims, 15 Drawing Sheets

6,045,070

MATERIALS SIZE REDUCTION SYSTEMS AND PROCESS

This is a continuation-in-part of previously filed application Ser. No. 08/897,296 filed Jul. 22, 1997, Ser. No. 08/802,848 filed Feb. 19, 1997 and Ser. No. 09/023,051 filed Feb. 13, 1998, the latter incorporated herein by reference.

BACKGROUND OF THE INVENTION

1. Field of the Invention

This invention relates generally to materials size reduction and more particularly to systems and processes relating to the presizing of industrial materials by variably shredding and granulating liquefied materials prior to processing or recycling.

2. General Background

It is well known that a great many materials must be reduced or otherwise uniformly sized in order for them to be processed, recycled or transported. Various types of size reduction apparatus have been developed for this purpose. Large bulky objects for example are passed through shredders, hammer mills, chippers and the like as a method of coarse size reduction. Whereas, finer granular materials are passed through grinders and ball or roller mills The materials are often passed over screens to insure size uniformity, with non-conforming materials being sent back through the apparatus for reprocessing. This reprocessing causes flow restrictions during production often requiring over sizing of the apparatus or the use of multiple apparatus to compensate. Most material sizing apparatus such as grinders are configured for a specific product and a fixed discharge particle size. Such sizing apparatus are generally sold independently rather than as a system. Therefore, such equipment must be selected for an application based solely on its capacity and proven capability for sizing a particular material. Such grinders are simply not capable of handling a wide range of liquefied materials and providing a variably predictable particle discharge size without the use of screens or reprocessing. Therefore, systems which require conversion of high volumes of high quality materials at a minimum cost have not be possible with conventional apparatus.

It is therefore, an object of this invention to provide various systems which utilize unique technological apparatus which can be configured in a variety of ways to perform efficiently in a host of different applications.

It is also an object to provide high volume size reduction systems which are cost effective by reducing power consumption, utilize recycling techniques wherever possible and practical, and separate and recover as many high quality, sized, reusable materials as possible.

SUMMARY OF THE INVENTION

U.S. Pat. No. 5,586,729, by the present inventor, discloses a method and apparatus for sizing solid material in a fluid carrier. The patent discloses both a dispersion apparatus having various embodiments as well as an in-line grinder which is capable of sizing solids while they are carried through the machine by the fluid. The present disclosure illustrates and claims the many ways in which the subject equipment can be use to form a size reduction system to accomplish specific end results in particle size reduction and quality.

It should be understood the previously disclosed equipment may be configured in a variety of ways to perform in a host of different applications. For example, disclosed herein are configurations which are best used to process materials such as hazardous waste, medical waste, municipal waste, and yard waste. The system converts hazardous waste into a useable fuel product for cement kilns and industrial furnaces. It can also be configured to grind medical waste into an unrecognizable form while simultaneously disinfecting the material thus allowing such waste to be disposed in a conventional manner. Processing of municipal waste and biomass by the system allows the removal of all metal, sand, and glass from the waste while simultaneously producing a finely ground product suitable as a fuel product or as a feedstock to other chemical or biological process capable of quickly converting the feedstock to methane or alcohol.

In the pulp and paper industry, the disclosed systems can be used to pulp waste paper at a fraction of the conventional cost. It is also used to convert rejected wood knots and wood slivers from the pulping process into useable paper fiber. Further, the systems can process wood chips in the presence of certain chemicals into a useable paper pulp.

In the oil exploration industry, the systems disclosed herein can be used to grind drill cuttings to micron particle size so that they can be injected down-hole as an economical disposal means. In the steel industry, the process can be used to process and refine the non-metal residue resulting from the shredding of cars and other scrap materials. The system can convert this shredder residue (containing plastics, rubber, textiles, wood, and glass) into a useable commercial fuel product as well as a suitable feedstock to other chemical and biological processes.

Agricultural applications for the size reduction processes are far ranging. The systems disclosed herein are equally capable of processing animal remains ranging from chicken feathers to bones to animal guts so that the resulting material can be further processed into animal feed, oils, make-up and other products. Finally, the size reduction system can be applied in agricultural applications such as the production of sugar from cane and beets. In this application, the cane can be harvested and ground on site to produce a dilute liquid sugar which would then be transported by tank truck to the mill for further concentration. The net result of the on-site processing would be to reduce the cost of transporting the cane as well as to maximize sugar yield by preventing degradation of the sugar cane. Fine grinding of sugar beets prior to the extraction step would improve the efficiency of the entire sugar making process.

Industrial applications for the size reduction system are far ranging. The systems disclosed herein are capable of converting high volumes of whole tires to high quality granulated rubber at minimum cost by accomplishing size reduction in a wet environment. The wet processing of rubber provides the added advantage of using chemical plasticizers and binding agents as the carrier fluid so that a high quality granulated rubber is produced. This granulated rubber is suitable for mixing with plastics and resins and then extruding the mixture to make products having resilient properties. In like manner, the system is capable of granulating high volumes of plastics and resins to produce a feedstock for other commercial processes.

One of the patent applications referenced herein is titled Rotary Grinder. The Rotary Grinder application illustrates the use of an adjustable rotor having a number of stator-rotor combinations which interchangeably mount in the machine to accomplish a wide variety of size reduction needs. The systems disclosed herein and there application utilize the same principles to the attrition zone found in the multishear disperser disclosed in my earlier patent and applications in a manner whereby the machines can be configured to accommodate a wide variety of process applications.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

DETAILED DESCRIPTION OF THE PREFERRED EMBODIMENT

Figure 1:
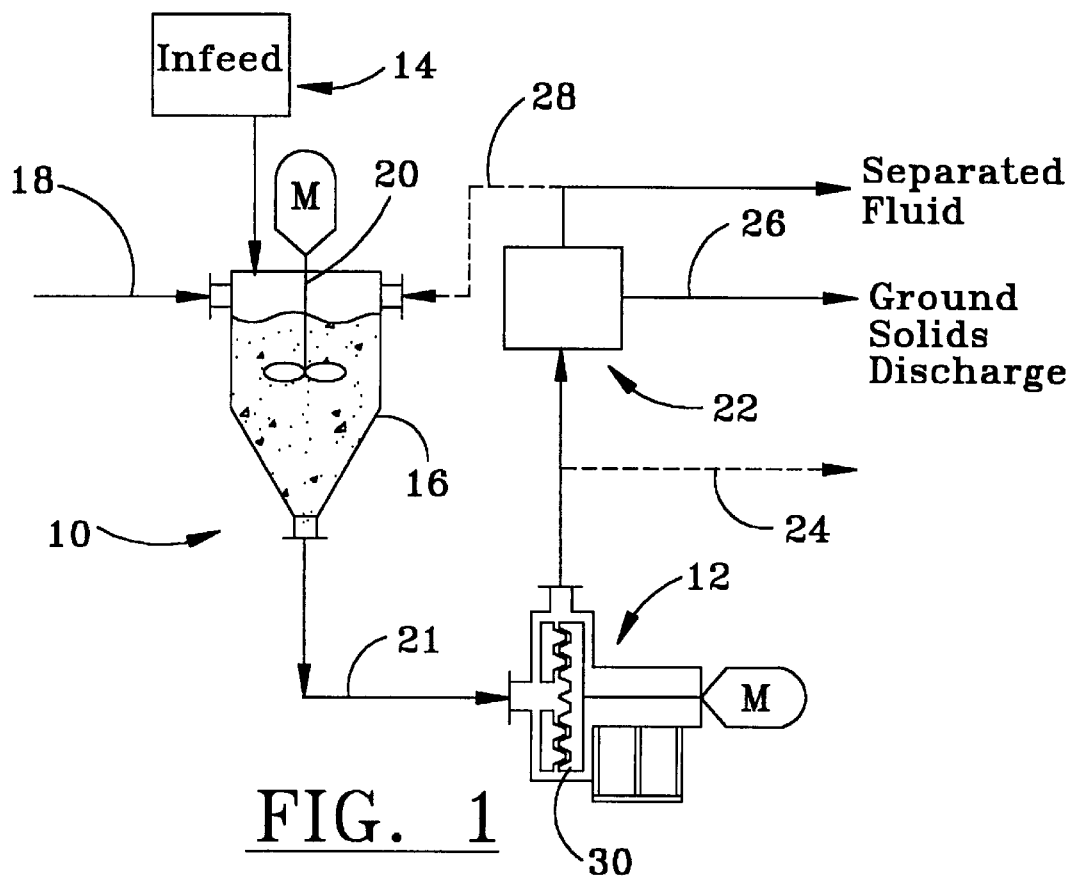
FIG. 1 is a schematic diagram of a system featuring a variable displacement inline grinder.

In the description which follows, like parts are marked throughout the specification and drawing with the same reference numerals, respectively. The drawing figures are not necessarily to scale and certain features may be shown in schematic form in the interest of clarity and conciseness.

FIG. 1 illustrates a basic size reduction system 10 which includes an in-line grinder apparatus 12 powered by motor "M". The variable displacement in-line grinder 12 referred to herein and in my previous applications as a Disk Attrition Mill is a device which grinds and sizes entrained solid particles as they are fluidly carried through the machine. Therefore, it is necessary to unite such solids with a fluid into a slurry in a receiving tank 16 prior to entry into the varable displacement in-line grinder 12. Any solids feed system 14 may be used to deliver the solids to the receiving tank 16. This includes, but is not limited to, belt conveyors, screw conveyors, manual feeding, pneumatic conveying, drag conveyors, pumping in a fluid slurry, and many others. A fluid may also be supplied through line 18 to the receiving tank 16 where the fluid is mixed and agitated with the solids by mixer unit 20 until a consistent blend is achieved. Virtually any fluid can be used to carry the solids into the in-line grinder. Typical fluids used would include water, oil, chemicals, cryogenic fluids such as liquid nitrogen, polymers, and many others. After passing through the grinder 12 a solids separation system 22 is utilized to recover the fluid carrier and simultaneously separate ground solids for further use. The solids separation system 22 may take several forms, depending upon the application, including oscillating screens, pressure filters, screw presses, filter presses, belt presses, centrifuges, gravity sedimentation units, hydrocyclones, and many others. The solids separation system may also include auxiliary equipment such as pumps, tanks, piping, and controls.

In operation, the system 10 described in FIG. 1 receives solids and make-up fluid in the agitated receiving tank 16. The variable displacement in-line grinder 12 continuously withdraws the solids/fluid mixture from the receiving tank 16 through line 21 and grinds it to a selected fine particle size as it passes through the machine. Ground slurry mixture being discharged from the grinder 12 can either be selectively diverted downstream through line 24 to other uses or else it can be delivered to the solids separation system 22. Ground solids separated and recovered by the system 22 may also be selectively diverted through a discharge line 26 elsewhere for further processing. Recovered fluid may also be selectively delivered for further processing, but the most likely use of the fluid is to recycle it back to the receiving tank through line 28 where it is used to transport additional solids into the in-line grinder. In this fashion, the only additional carrier fluid required by the system 10 is the small make-up stream delivered through line 18 or combined with a combination solids/fluid in feed being fed to the receiving tank 16, to balance the fluid leaving the system with the solids.

The system 10 as described may be used with any family of solids which can be made to mix homogeneously with a carrier fluid. However, the particle size of the solids fed should not exceed 75% of the diameter of the suction line to the in-line grinder. The particle size of solids leaving the system would range from ⅛" diameter down to 400 mesh, depending upon how the interchangeable disk 30 located within the in-line grinder 12 is configured and set.

Figure 2:
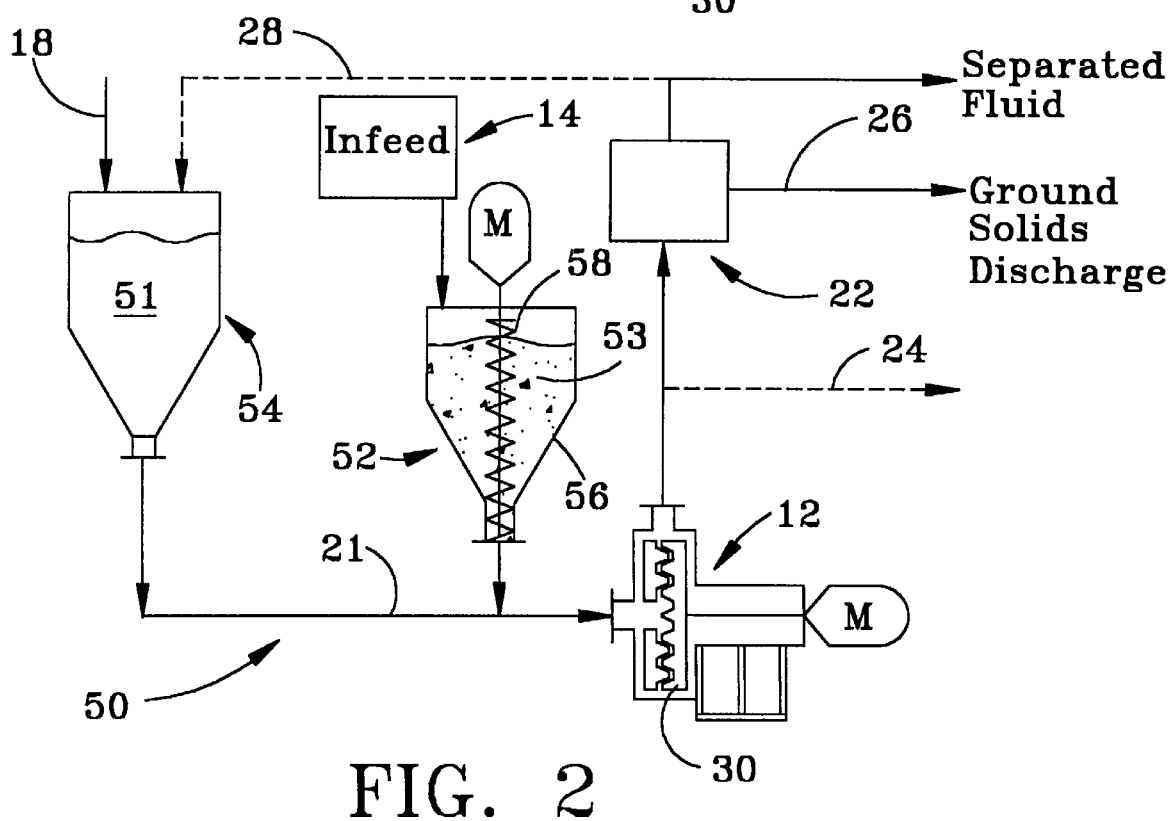
FIG. 2 is a schematic diagram of a system featuring a variable displacement inline grinder with solids feed system.

The system 50 shown in FIG. 2 utilizes the same components shown in FIG. 1 with the exception of the solid and fluid feeding components 52, 54. In this system 50 the fluid 51 is delivered to a feeding tank 54 which is also connected to the in-line grinder 12 suction line 21. A solids feeding system 52 is connected to the same suction line 21 so that solids 53 can be separately metered into the suction line 21 prior to entry into the in-line grinder 12. The solids feeding system 52 receives solid material 53 from any solid feed system 14 into a receiving tank 56 where it is continuously metered into the in-line grinder suction line 21 by way of a screw conveyor or auger system 58. In all other respects, the system operates identically as the one described in FIG. 1. The system 50 as illustrated in FIG. 2 is used to better control the feed rate of solids 53 into the in-line grinder 12.

It is also best used for solids which are either too light or too heavy to produce a homogeneous mixture in the agitated feed tank 16 described in FIG. 1.

Figure 3:
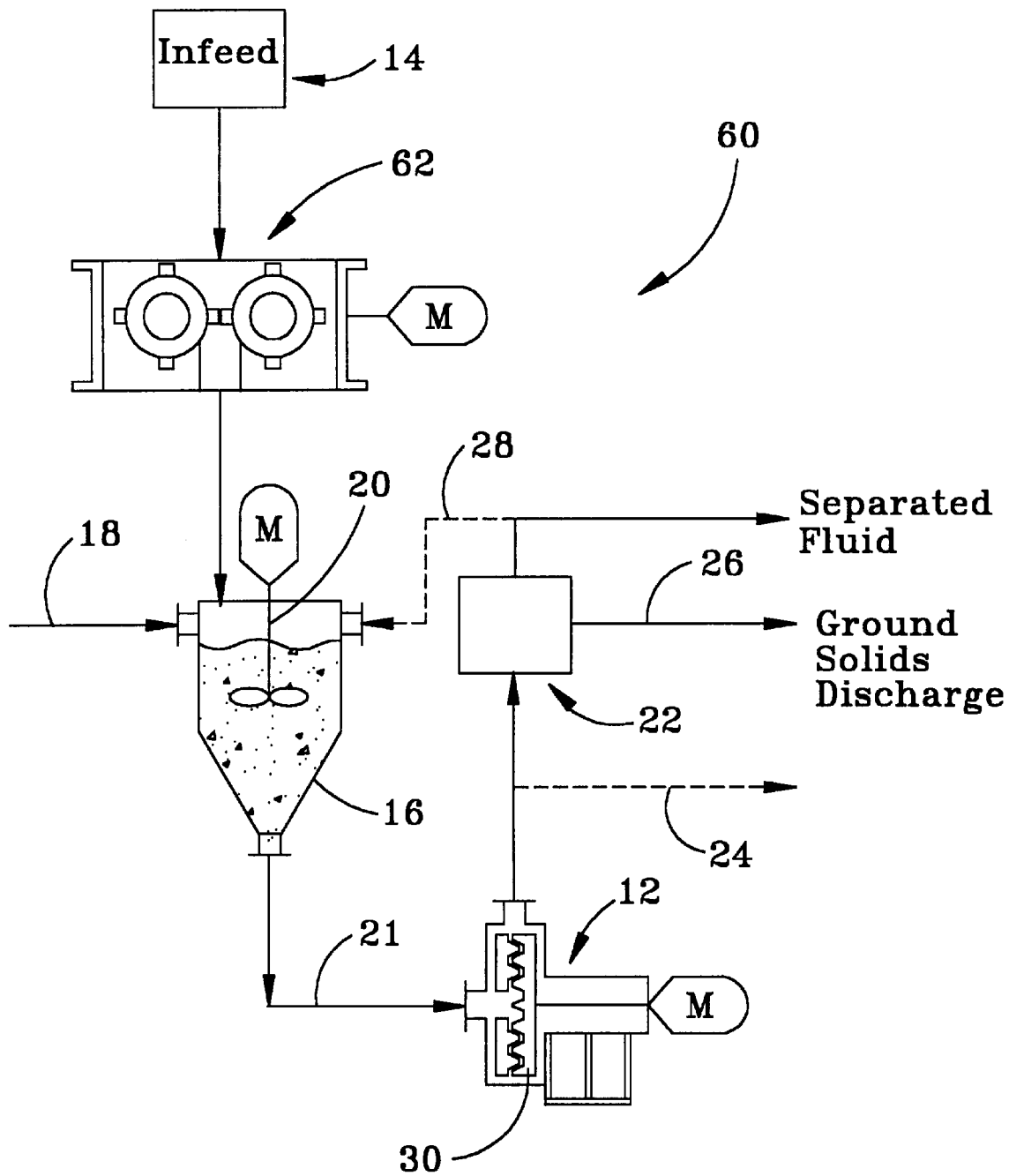
FIG. 3 is a schematic diagram of a system featuring a variable displacement inline grinder with a preshredder.

System 60 illustrated in FIG. 3 also utilizes the system illustrated in FIG. 1 and further includes the use of a shredding system 62. The shredding system 62 may be a rotary shredder, shear shredder, knife hog, hammer mill, tub grinder, or any device which reduces the particle size of the entering solids. However, the preferred embodiment utilizes the configurable shredder described in my prior patent application identified and referenced herein.

In operation, large solids are conveyed to the shredder through any of a wide variety of feed system 14. Solids are then reduced by the shredder 62 to a size satisfactory for the processing system 60. Typically, solids should be reduced to a 2" to 4" diameter particle size for successful processing by the in-line grinder 12. Also, experience has found that the throughput of the system is significantly improved by maintaining a uniform reduction of the particle size being fed to the in-line grinder 12. The system 60 can typically process solids at twice the production rate by halving the particle size fed to the in-line grinder 12. In all other respects, the system 60 operates identically as the system 10 described in FIG. 1.

Figure 4:
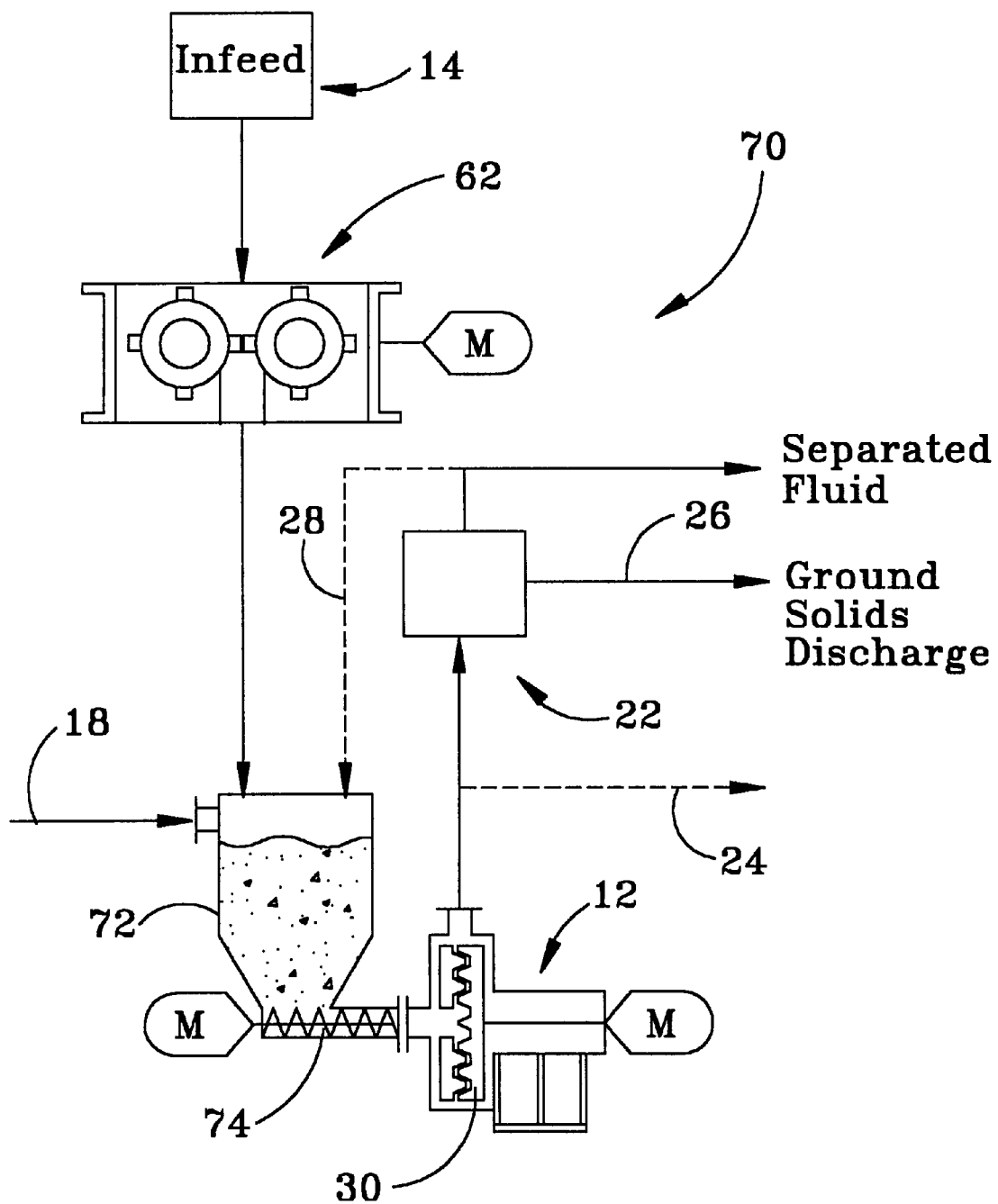
FIG. 4 is a schematic diagram of the system as illustrated in FIG. 3 with a solids feed system.

The system 70 illustrated in FIG. 4 illustrates the use of a shredding system 62 to begin the size reduction process in a manner similar to the system 50 illustrated in FIG. 2. In this system 70, the fluid feeding tank 54 and the solids feeding tank 52 illustrated in FIG. 2 are combined into one vessel 72. The feeding tank 72 in this embodiment contains a horizontally mounted screw conveyor 74 in its bottom which continuously meters solids and fluid into the suction of the in-line grinder. This configuration is best used with solids which are heavier than the fluid because it depends upon gravity keeping the screw conveyor filled with solids. For example, shredded tire chips sink in water and they would work well in this application, but shredded foam rubber floats in water and they would not. A preshredder 62 is used to reduce the particle size of large solids to one acceptable for the in-line grinder 12.

Figure 5:
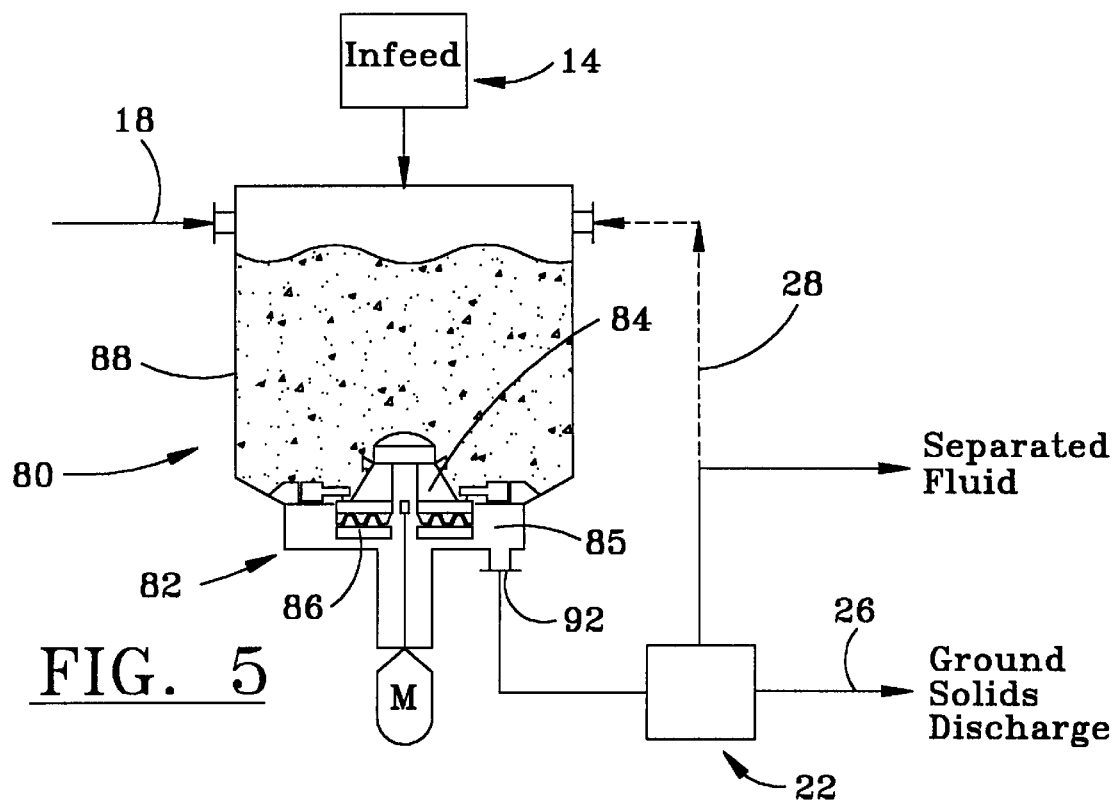
FIG. 5 is a schematic diagram of a system featuring a variable displacement dispersion mill.

An expanded version of the variable displacement inline grinder concept in the form of a variable displacement dispersion mill or system as disclosed and taught in my earlier patents and application is illustrated in FIG. 5 as the major component of a size reduction system 80. The dispersion apparatus 82 unites the fluid and solid materials, sizes the solids while simultaneously agitating the contents of the tank so that a homogeneous mixture of fluid and solid results, regardless of the density of the solids. The top side of the dispersion apparatus rotor 84 being exposed to the content of the tank 88 provides coarse material size reduction action while the variable displacement rotor 86 provides a finer grind of the solids in the attrition zone 85. A mixture of ground solids and fluid is discharged from the attrition zone 85 for further processing. The preferred embodiment shown in FIG. 5 utilizes a rotor 86 located at the bottom of a conical tank 88 to facilitate solids migration into the rotor 86. Other configurations of the dispersion apparatus 82 are also possible by mounting and driving the rotor from the side of the tank 88. Finally, the rotors may be inverted, supported and driven from the top side of a tank to achieve the same results as illustrated in my earlier applications and referenced herein. The configuration shown in FIG. 5, for example is an excellent method of grinding medical waste to an unrecognizable and compact form while simultaneously disinfecting the material by dispersion in a fluid such as alcohol or formaldehyde which kills all germ and viruses which may be present. In most locations, the resulting material can then be disposed of as non-hazardous municipal waste.

FIG. 5 further includes a feed system 14, again, any feed system may be employed to carry solids into the dispersion apparatus where it is united with a choice of many types of fluid carriers which may be present at the infeed or supplied though fluid line 18. The solids carried to the dispersion apparatus 82 are typically 6" in diameter or less with infeed flows approaching up to 20 tons per hour of solids. In its simplest system form, the dispersion system 80 is interconnected with a solids separation system 22 which separates the ground solids from the carrier fluid. The separated solids may be further processed or utilized while the recovered fluid may be selectively recycled back to the dispersion tank 88 by way of line 28 for use in carrying more solids through the system. In this case, a small fluid make-up stream 18 is required to offset the loss of fluid leaving with the solid stream from the system.

Figure 6:
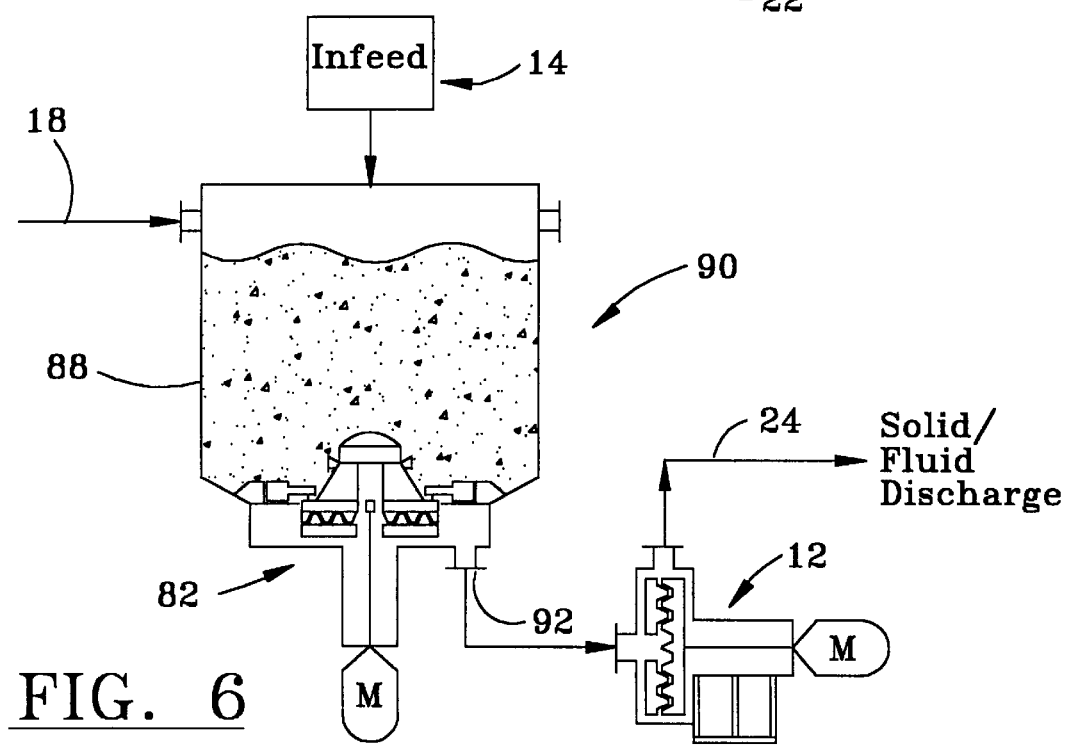
FIG. 6 is a schematic diagram of a system featuring a variable displacement dispersion mill in combination with a variable displacement inline grinder.

In like manner, FIG. 6 illustrates the use of a dispersion system 90 which utilizes the dispersion mill 82 first illustrated in FIG. 5 in series with an in-line grinder assembly 12. In this configuration, the solid/fluid mixture leaving the dispersion apparatus 82 at discharge 92 is routed to the in-line grinder 12 where the mixture ground to predetermined fine grind size before being discharged for further refining or processing through discharge line 24. In this configuration, the variable displacement dispersion apparatus 82 acts as the coarse grinding system while the variable displacement in-line grinder 12 acts as the fine grinding system. The net result of this type system 90 is to produce a finer grind of the solids than would have otherwise been possible with the dispersion apparatus alone. An additional advantage of the system is to increase the tonnage of solids that can be processed by sharing the size reduction task between the two machines 82,12. In series, the two machines 82,12 working together can process more solids to a finer particle size in shorter period of time than would have been possible independently. This configuration is particularly useful in processing solid hazardous waste material in a liquid hazardous waste fluid to yield a fine suspension of ground solids that is used as a blend stock for alternative fuel for cement kilns etc.

Figure 7:
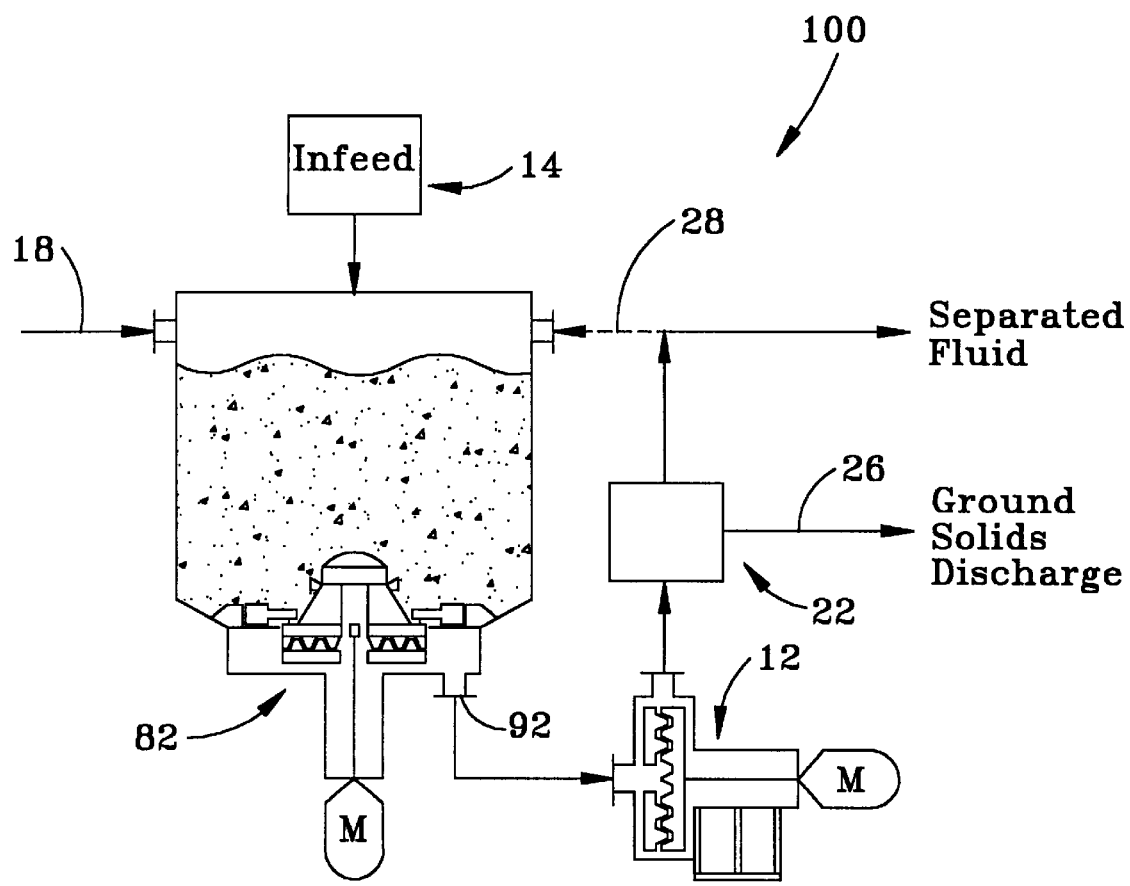
FIG. 7 is a schematic diagram of a system featuring a system as illustrated in FIG. 6 except with solids separation capability

FIG. 7 illustrates the use of the size reduction system 100 as discussed above and illustrated in FIG. 6 with the addition of a solids separation system 22, discussed earlier, attached to the discharge of the in-line grinder 12. With this configuration, the ground solids may be selectively recovered separately from the carrier fluid. The arrangement further provides an opportunity to recycle the recovered fluid back to the dispersion apparatus though line 28 where it can again be used to carry solids through the system. An example of this system's use would be in the processing of shredded tire chips into granulated rubber. The carrier fluid could be water, but it could just as easily be a liquid plasticizer and binder which enhances the properties of the rubber for use with plastics. The benefits of this plasticizer is well known within the art.

Figure 8:
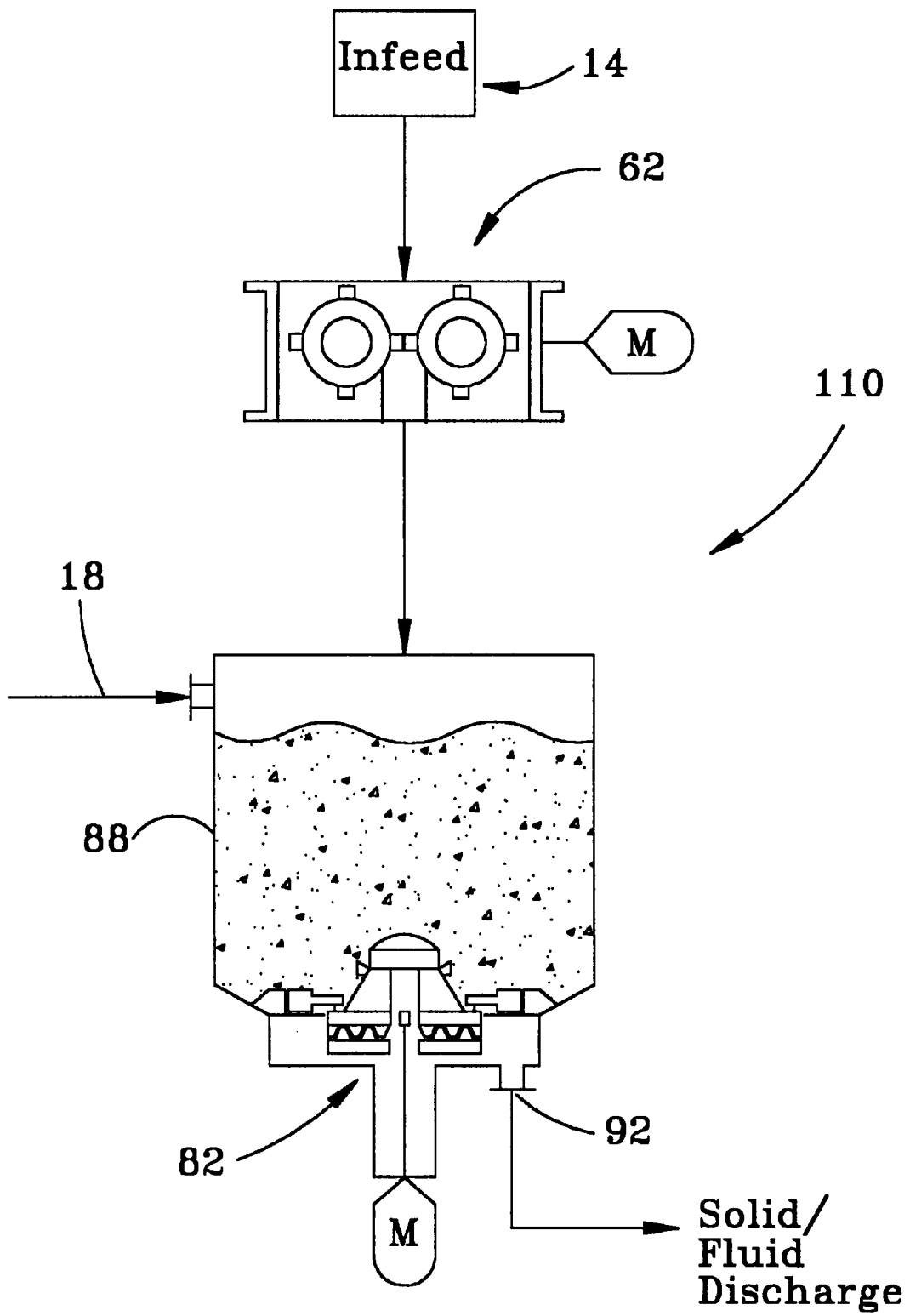
FIG. 8 is a schematic diagram of a system featuring a variable displacement dispersion mill in combination with a preshredder system.

A dispersion system 110 is shown in FIG. 8 interconnected to a preshredding system 62 as discussed earlier herein. In this configuration, the shredder reduces large solids to a particle size suitable for processing by the dispersion apparatus generally averaging 6 inches in diameter. A flow of fluid entering through line 18 and/or present with the infeed materials supplied by infeed system 14 is united with the shredded solids by the dispersion apparatus 82 and the ground mixture is discharged at outlet 92 for further refining, processing or manufacture.

Figure 9:
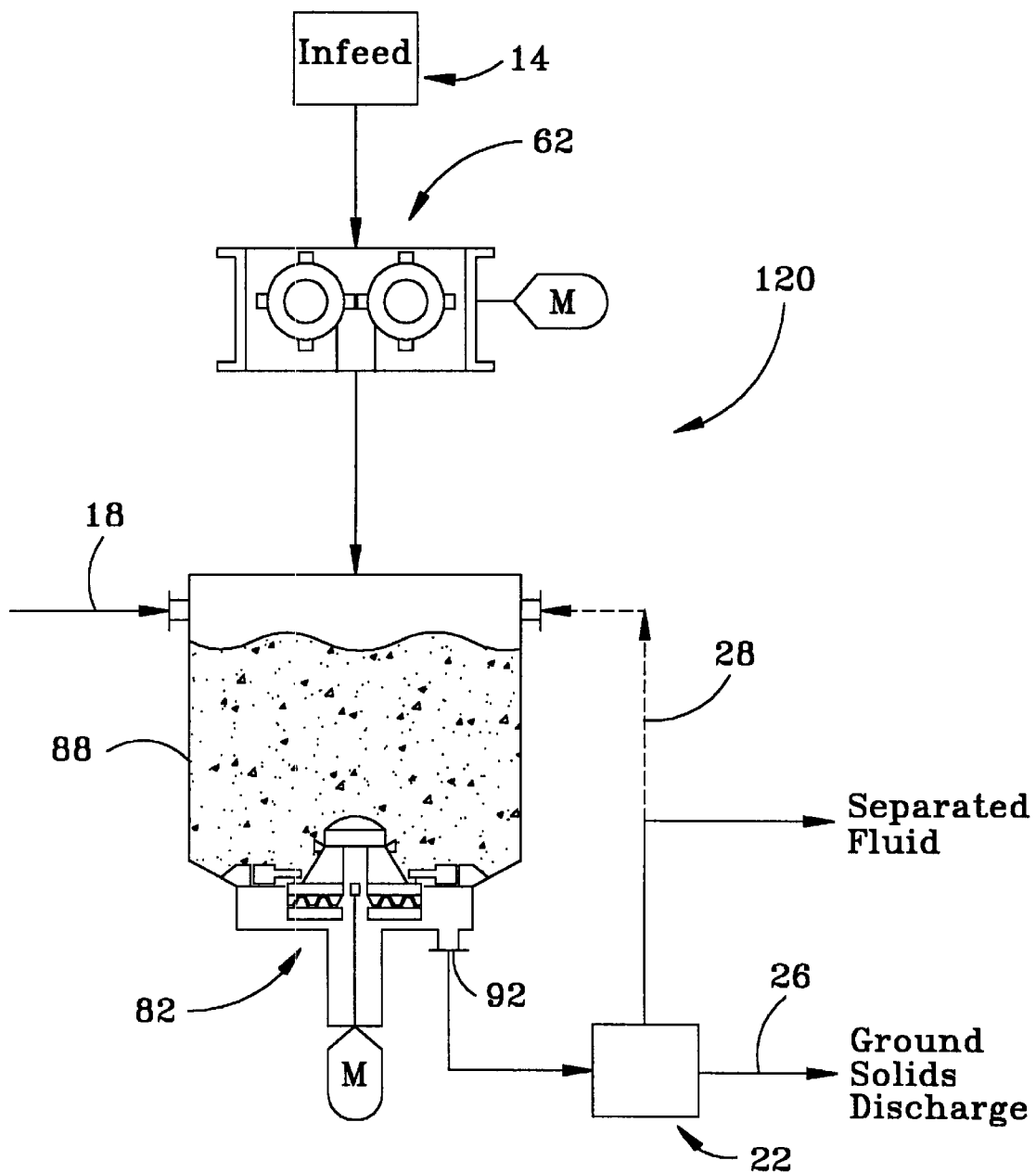
FIG. 9 is a schematic diagram of a system as illustrated in FIG. 8 and including solids separation system.

The system 120 illustrated in FIG. 9 further illustrated the use of a solids/fluids separator 22 as part of the system as illustrated in FIG. 8, thereby providing a selective option for recycling fluids.

Figure 10:
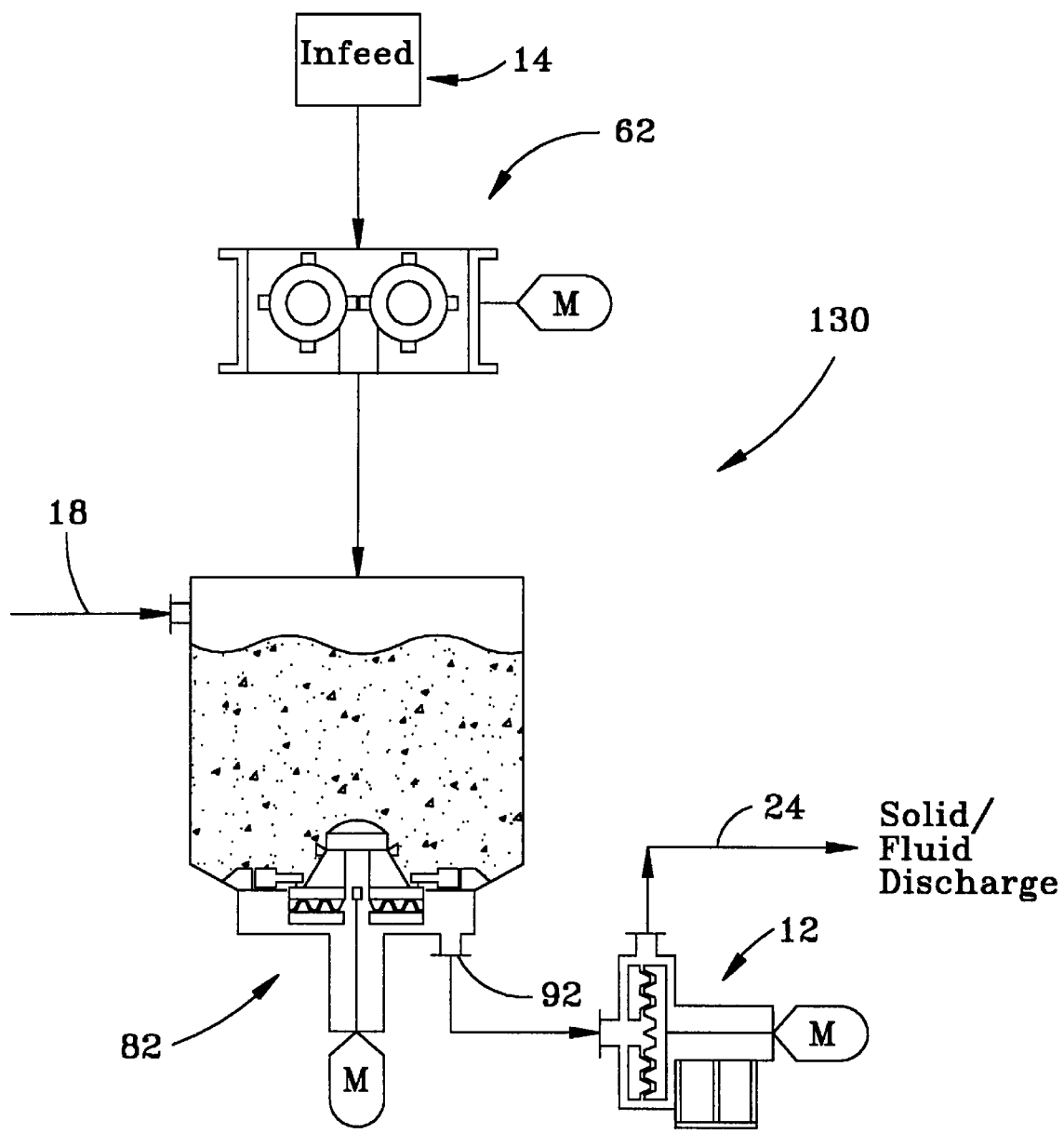
FIG. 10 is a schematic diagram of a system illustrated in FIG. 6 in combination with a preshredder system.

Likewise, FIG. 10 illustrates the use of a preshredding apparatus 62 to size solids prior to entry into the size reduction system shown in FIG. 6. This system 130 has a high capacity for processing and grinding large solids into a fine fluid suspension. An example of its application may be the processing of bulk quantities of solid hazardous waste into a fluid suspension of liquid hazardous waste to produce a suitable fuel product for cement kilns and industrial furnaces.

Figure 11:
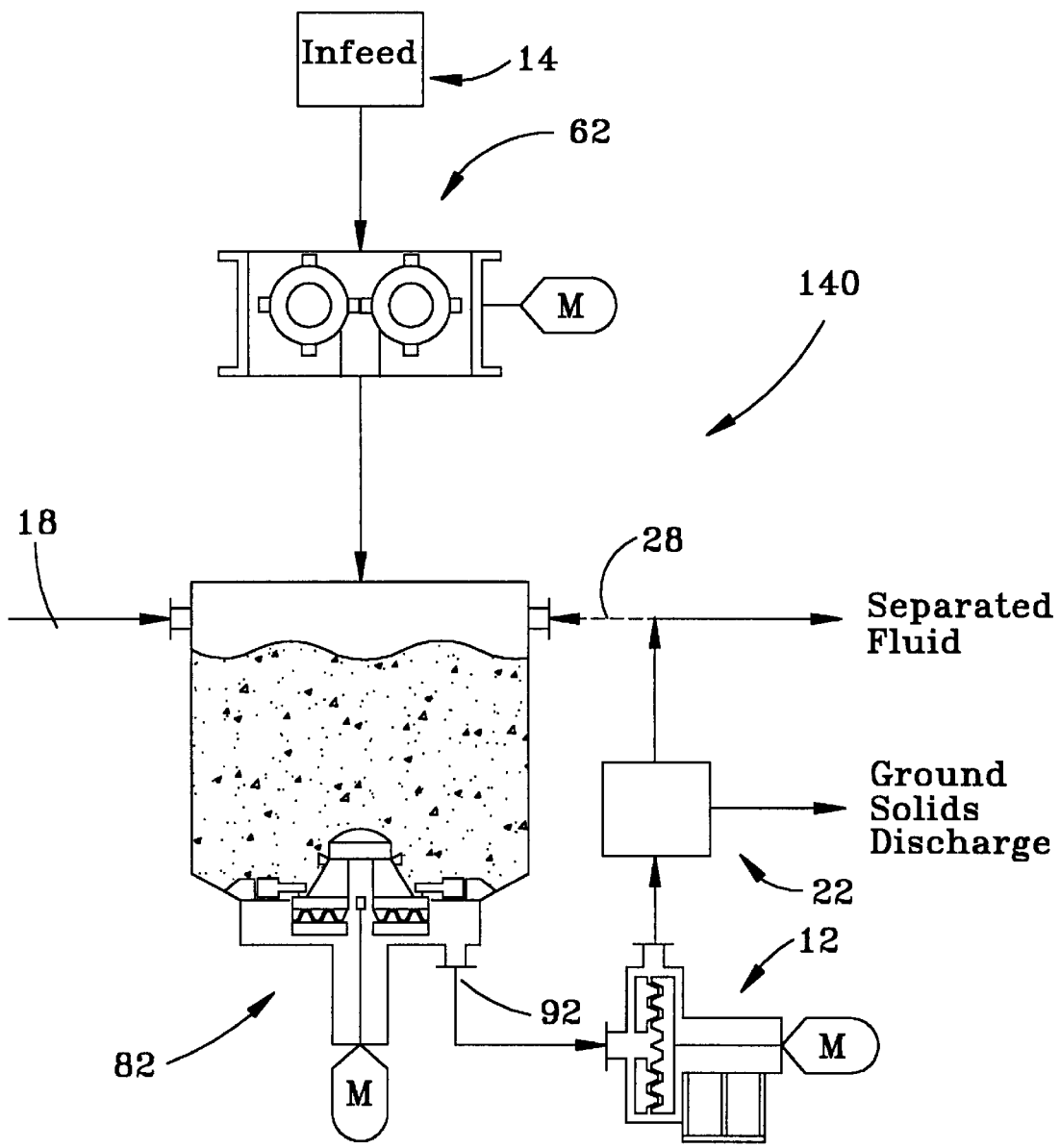
FIG. 11 is a schematic diagram of a system as illustrated in FIG. 7 in combination with a preshredder system.

In similar manner, FIG. 11 illustrates the use of a pre-shredding apparatus 62 prior to entry into the size reduction system 100 illustrated in FIG. 7. This collective system 140 has a capacity to process high tonnage's of large solids and to recover the ground solids while recycling the carrier fluid continuously. A notable use for this system would be the processing of whole tires into granulated rubber. The shredder 62 would reduce whole tires to 2" ships while the dispersion apparatus 82 would reduce the 2" chips to ¼" chips. Finally, the in-line grinder would reduce the ¼" chips to as fine as 400 mesh, depending upon configuration of the machine. The ground rubber would be recovered by the solids separation system 22 while the fluid carrier would be recycled back to the dispersion tank 88 for reuse.

Figure 12:
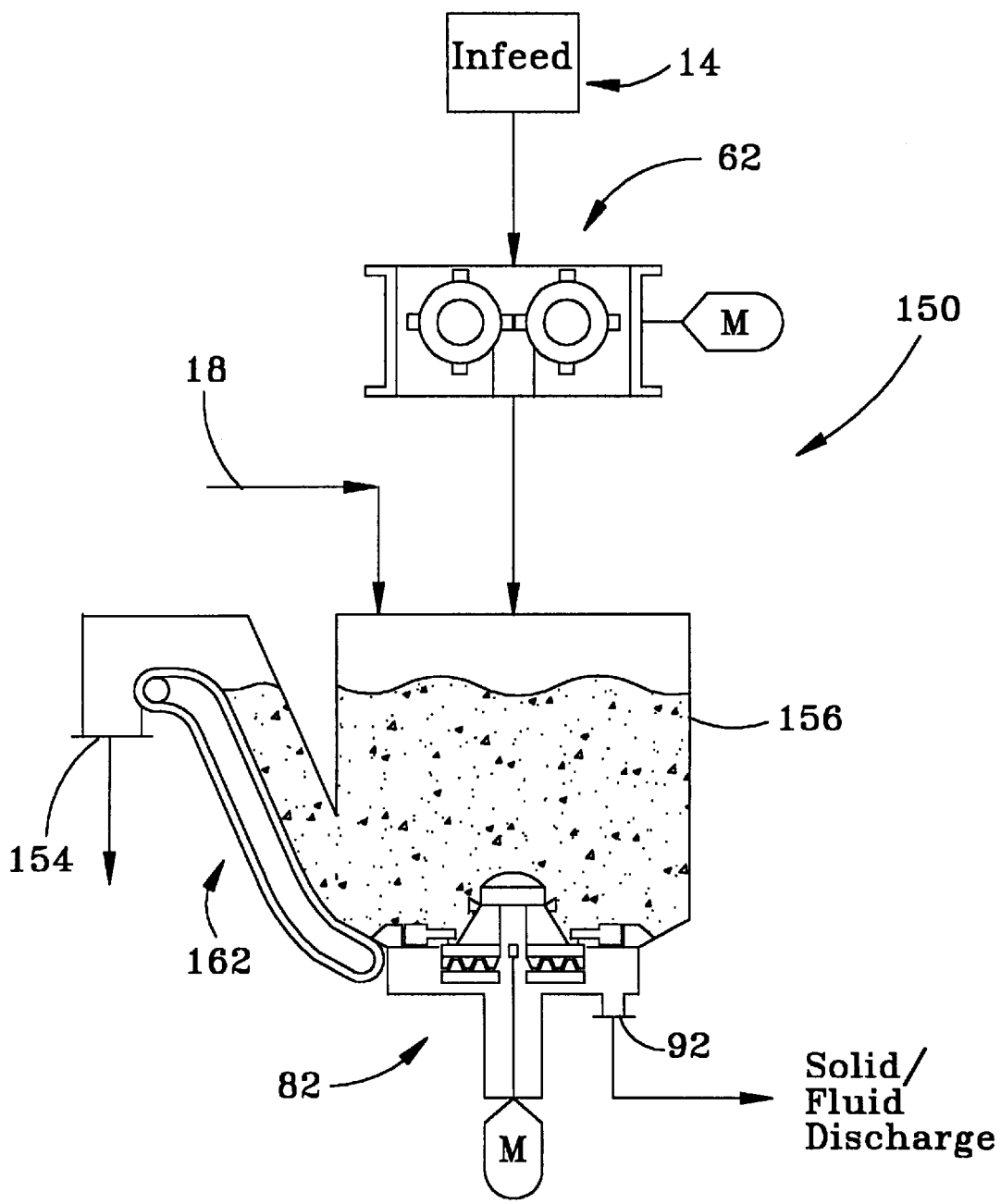
FIG. 12 is a schematic diagram of a system featuring a variable displacement dispersion mill having a metal removal system in combination with a preshredder system.

A magnetic removal system 150 can be added to the dispersion apparatus 82 illustrated in FIG. 8 to produce the system 150 shown in FIG. 12. The integral magnetic removal system 152 disclosed in my earlier applications and patents and incorporated herein allows the size reduction system 150 to accept solids which contain ferrous metals. In operation, the magnetic removal system 152 continuously removes ferrous metals, deposited into the dispersion apparatus 82 by the preshredder 62, by discharging them through port 154. The solids remaining in the tank 156 are processed by the dispersion apparatus 82 and discharged as a solid/fluid mixture at discharge port 92.

Figure 13:
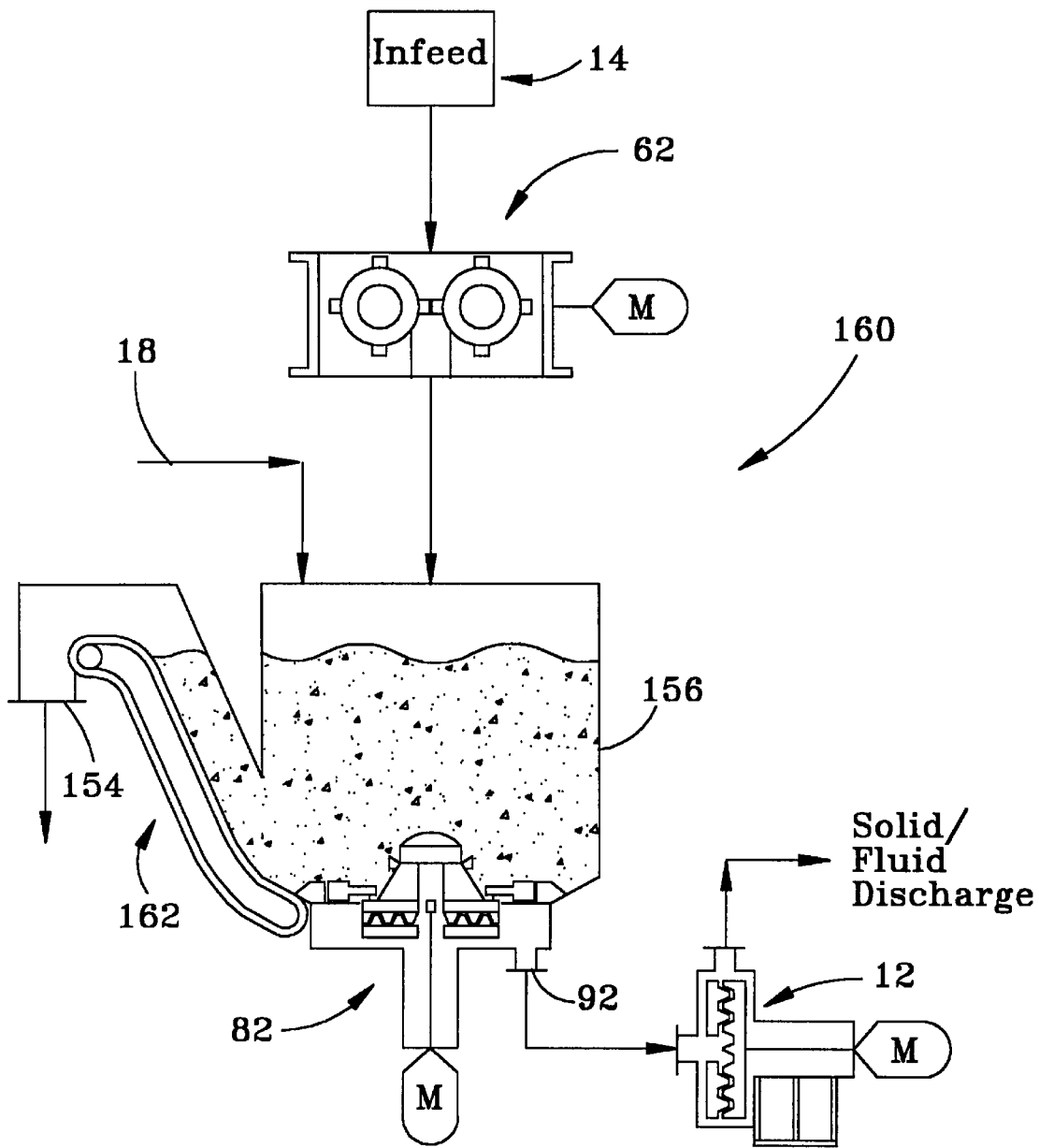
FIG. 13 is a schematic diagram of a system as illustrated in FIG. 12 and including a variable displacement in-line grinder.

The system 150 illustrated in FIG. 12 is further enhanced in the system 160 illustrated in FIG. 13 wherein a variable displacement in-line grinder 12 is added to system. This arrangement allows the system 160 to process high tonnage's of large solids which may contain ferrous metals while producing a particle size as small as 400 mesh at the system discharge 92.

Figure 14:
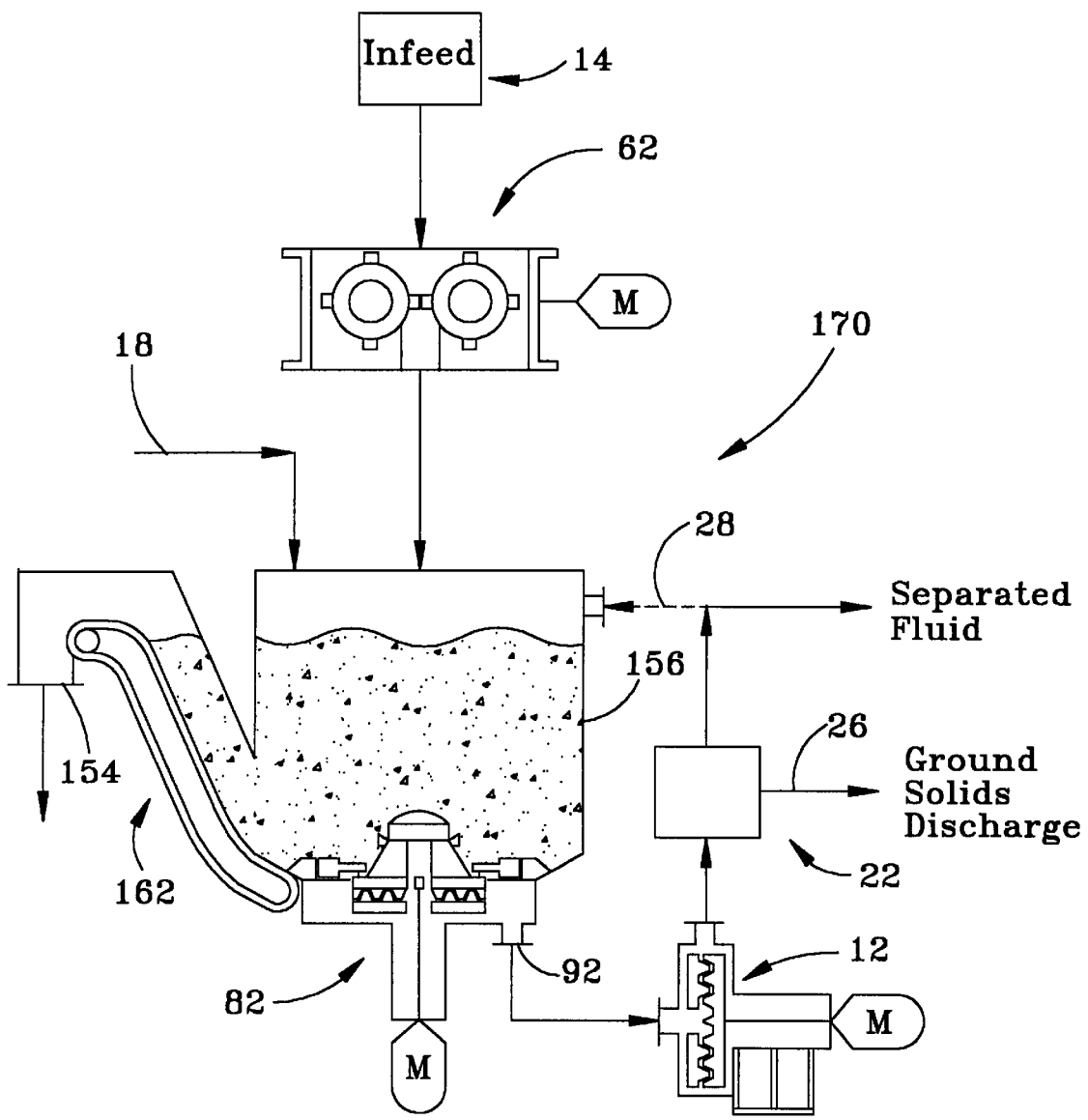
FIG. 14 is a schematic diagram of a system as illustrated in FIG. 13 and including a solids separation system.

Likewise, FIG. 14 illustrates a size reduction system 170 similar to that of the system 160 illustrated in FIG. 13 except with the addition of a solids separation system 22. With this arrangement the ground solids may be separated from the discharge stream while the recovered fluid may be recycled back to the dispersion apparatus for further use in carrying solids through the system. With this embodiment, for example, shredded tires containing steel belts may be successfully granulated and recovered while the steel from the belting can be separated and discharged through the magnetic removal system 152.

Figure 15:
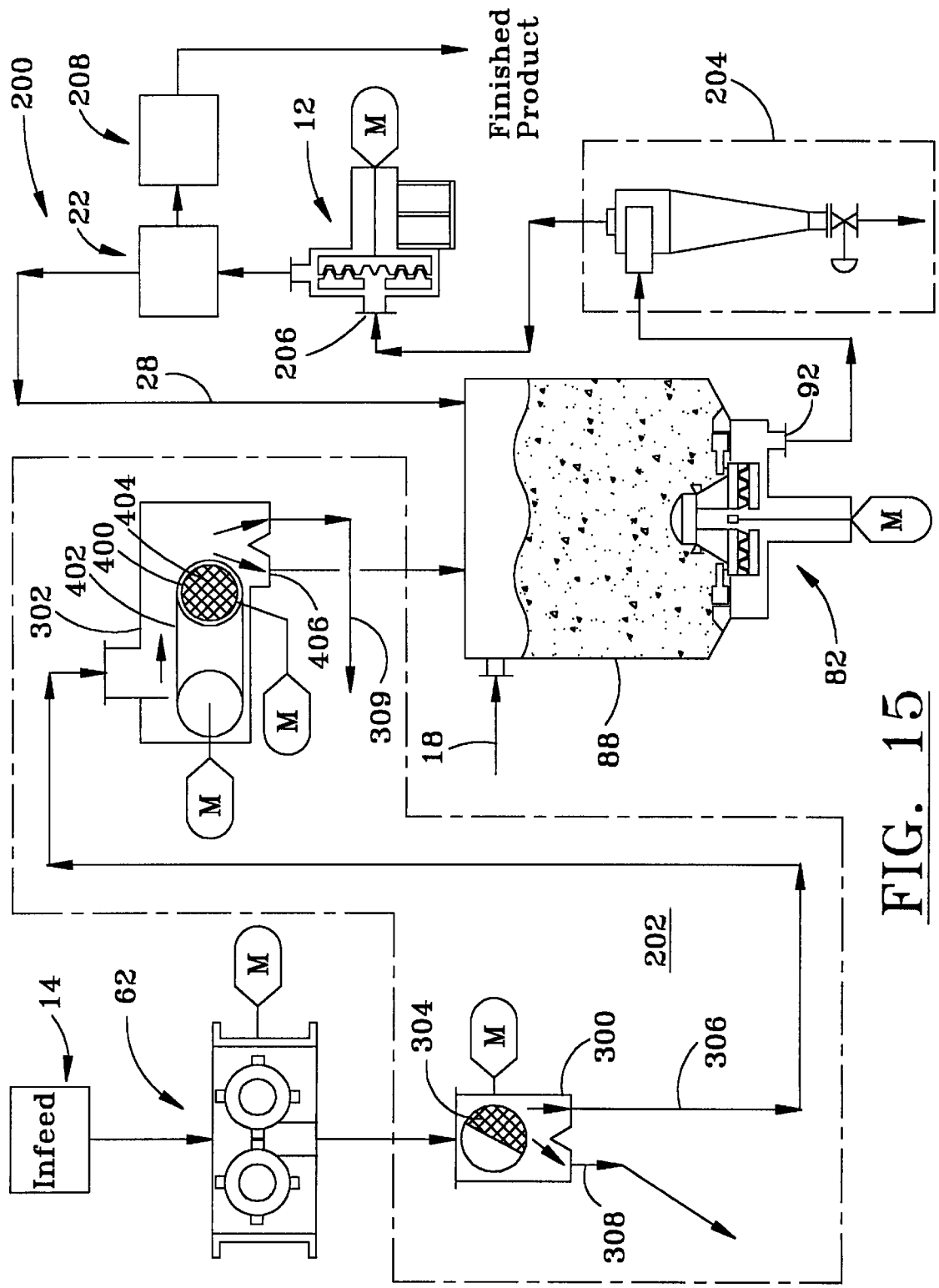
FIG. 15 is a schematic diagram of a system as illustrated in FIG. 11 and including magnetic, eddy current and cyclonic separation systems.

A complete size reduction system 200 suitable for processing municipal waste, biomass, or residue from shredding cars is shown in FIG. 15. The system includes all of the features shown in FIG. 11 with the addition of a metal removal apparatus 202 commonly referred to as an eddy current metals separator, located between the preshredding apparatus 62 and the dispersion apparatus 82 as well as the addition of a solids refining system 204 located between the dispersion unit discharge 92 the inlet 206 to the in-line disk grinder apparatus 12. This arrangement provides the system 200 with the capability of removing both ferrous and non-ferrous metals from the fluid stream prior to the dispersion apparatus 82. The dispersion apparatus 82 tends to free up the remaining metals that may be entrapped in the solids fed. As a result, an additional refining step in the form of a Hi/low cyclonic solids refining separator 204 for separating high density heavy solids from low density lighter ones is necessary to remove these newly freed metals. The lighter or non metal materials are then feed to the inline grinder 12 for final sizing before being discharged to the fluid/solids separator 22 Finally, the solids leaving the fluid/solids separation system 22 may be further processed through the use of additional equipment such as a pelletizer or cuber 208. Again the carrier fluid is then recycled back to the dispersion tank. 88 In the configuration shown in FIG. 15, the process would continuously grind waste materials, remove all metals, sand, and glass present, and then cube the solids to produce a suitable commercial fuel product.

The metal removal system shown in FIG. 15 is typically composed of a magnetic drum separator 300 to remove ferrous metals followed by an eddy current separator 302 to remove all non-ferrous metals which may be present in the stream. The magnetic drum separator 300 operates by attracting ferrous metals to the rotating drum 304 during one half of the drum rotation. The magnetized portion of the drum holds ferrous metals to the drum during the time when all other material is falling off the drum and exiting the discharge 306. The ferrous metal is held to the magnetic drum 304 until it is positioned above the metal discharge port 308 whereby the magnetic attraction ends and the ferrous metal are left to fall through the metal discharge port in the separator housing. The eddy current separator 302 removes all other metal by establishing an electric field which repels the metal to a discharge outlet 309 in the equipment housing. A fast rotating magnetic drum 400 is used to establish the eddy currents and a belt conveyor 402 is used to carry the solids over the eddy current generator 404 located inside the drum 400. All material not repelled by the eddy current generator 404 falls to the second discharge port 406 in the equipment housing.

The solids refining system 204 shown in FIG. 15 may take many forms. It could, for example, just as well be a decanter centrifuge. However, experience has found that the fine particles of metal, sand, and glass can most economically be separated using a hydrocyclone. The hydrocyclone uses centrifugal forces to accelerate the differences in density between materials. The heavier materials tend to spin downward against the hydrocyclone's lower cone and exit there. Lighter density materials tend to remain entrained in the fluid stream and exit at the top of the hydrocyclone. Since metals, sand, and glass are typically 1.5 to 4 times more dense than the other solids being processes, they are easily isolated and removed in the hydrocyclone. The same principles illustrated for removing metal in the refining system may be applied to any type of solids which can be separated based upon their difference in density. For example, a hydrocyclone can be tailored to remove most any material from the size reduction system thereby enhancing the value of the finished product.

The size reduction systems illustrated in FIGS. 1–15, discussed above can be used to process a variety of waste materials including hazardous organic waste, medical waste, biomass, and municipal waste. The technology most commonly specified today for the disposal of organic hazardous waste is thermal destruction. Thermal destruction of hazardous waste may be accomplished through incineration of the material by a permitted RCRA facility or by conversion and use of the material as a fuel to fire BIF permitted industrial furnaces such as cement kilns. Maturing of the environmental industry has seen the diversion of hazardous organic waste from the domain of the incinerators to the domain of the cement industry because the cement industry can utilize a wide variety of hazardous organic waste as a beneficial alternative fuel in making an important commercial product without increasing net emissions to the environment. In comparison, the thermal destruction of waste materials by incinerators typically requires a $50 to $100 million capital investment in facilities as well as high operating and fuel costs which produces toxic ash that must be landfilled. The net amount of emissions discharged into the environment is also increased by incinerating materials. All of these conditions result in high disposal costs for incineration compared to the low cost of utilizing organic hazardous waste as a fuel in the production of cement or other such manufacturing processes.

The environmental industry has evolved into one which charges disposal fees in proportion to the difficulty of processing. For example, liquid organic hazardous waste having a high BTU value is least expensive to dispose of because it takes little effort or equipment to bulk the material into tanks and handle it as a fuel product. Next, sludge type waste is incrementally more expensive to dispose of because it requires effort to remove the waste from its container and blend it with a suitable amount of liquid waste to produce a pumpable fuel product. Finally, solid hazardous organic waste demands the highest disposal fees because its fuel value is typically lower; it is more difficult to remove from its container; and it requires extensive processing to disperse the solids into a suitable organic liquid to produce a satisfactory pumpable liquid product. As a result of these circumstances, the environmental industry has been driven to develop ways in which to grind solids into a liquid carrier as a means of producing a fuel product for industrial furnaces. The approximate cost of disposing of the blended fuel at a cement kiln for example is in the range of 25 to 30 cents per gallon. The environmental company which accepts a solid organic hazardous waste from industry would typically charge $5 to $7 per gallon of solids disposal fee. One can see that a tremendous incentive exists for the liquefaction of solids for use as a blended fuel in industrial furnaces.

My previously issued patents discuss in great detail the method of liquefying solid hazardous waste using a liquid blend stock. Those patents outline a process whereby a shredding means is connected to a dispersion unit, or grinder, having a magnetic removal system integral to its housing. Shredded solid hazardous waste is united with liquid hazardous waste in the dispersion unit where it is ground into a fine dispersion. Connected in series with the dispersion unit is a supply pump which routes the ground fuel to a magnetic trap for the removal of ferrous metals. Afterwards, the material is routed to an in-line grinder for further reduction of the particle size of solids in the blended fuel. Finally, the ground mixture is routed to a heat exchanger and then to an accumulation tank. A second pump takes suction from the accumulation tank and recirculates the blended material back to the dispersion grinder. In practice, the system is first filled 30% to 70% with liquids. After establishment of the recirculation loop, solids may be continuously fed into the dispersion grinder from the shredding system. The shredded drum metal entering the dispersion grinder is continuously removed by the magnetic removal system while the waste contained in the drum is continuously ground into fuel. The batch is complete when the accumulation tank is filled. At that time the blended fuel would contain 30% to 70% solids, depending upon the amount of liquids used in the beginning.

Experience in the industry has proven that the system is capable of processing solids and liquids without the need for the recirculation loop described above. Elimination of the recirculation loop also eliminates the need for a heat exchanger to cool the blended fuel, since mechanical energy added to the fuel on a single pass is not significant. Finally, elimination of the recirculation loop allows continuous operation of the system by simply controlling the rate of blend stock and solids addition to the system. In the preferred arrangement, shredded solids are fed into the dispersion grinder along with an appropriate amount of blend stock. The mixture is continuously dispersed and delivered to an in line grinder for further reduction of the solids. Afterwards, the blended fuel is routed to a tank for accumulation. Once the tank is filled, the dispersion system may be connected to an empty tank and the process repeated.

The system 200 described herein in FIG. 15 is equally suitable for processing pre-shredded solids regardless of whether they originated from drummed or bulk sources. In the event that a drummed source is involved, the shredded drum metal may be removed prior to entering the dispersion grinder 82 or it may be removed by the dispersion grinder 82 through the use of an integral metal removal system. In any event, it is also preferable to route the blended fuel leaving the dispersion grinder through a magnetic trap or cyclone separator 204 to remove any metal fragments contained in the fuel. The disk attrition mill in-line grinder 12 also functions as a pump so that a separate supply pump is generally not required to deliver fuel from the dispersion grinder 82 to the in-line grinder 12.

Experience has shown that the system may be further simplified by using the dispersion grinder 82 as the only grinder in the system as illustrated in FIGS. 8 and 12. While in some cases the shredding means can be eliminated to produce a system configured as seen in FIG. 6. FIG. 10 illustrates the configuration for a fuel blending system without the need for metal removal capability, while FIG. 13 illustrates a system configured with a magnetic removal system integral to the dispersion grinder 82. The dispersion grinder 82 is capable of accepting and processing pre-shred solids as well as liquids and sludges. The grinder may be manually fed, or it can be fed by any typical material handling means. The fuel product leaving the grinder typically has solids as large as $\frac{1}{8}$" to $\frac{1}{4}$", but some kilns are capable of accepting the fuel product without the need for fine grinding of the solids.

Medical waste is composed of needles and other sharp objects along with all other material that come in contact, or is used by, the medical profession and patients. Such waste may also include human tissue. The collection and disposal of this medical waste is a large industry in the United States which is mostly dependent upon the use of incinerators. Incinerators insure that all viruses and germs in the medical waste are destroyed along with the medical waste itself. In most locations, it is legal to dispose of the medical waste as municipal waste provided all waste material is not recognizable or useable and provided that the waste is free of all viruses and germs. The dispersion grinder 82 illustrated in FIG. 7 is ideally suited for processing this medical waste because it is capable of grinding the material to a fine particle size using a wide variety of fluid carriers capable of killing all viruses, germs, and tissues found in the waste. The ground solids may be separated from the fluid carrier and accumulated for disposal. A small screw press is the preferred means for separating the ground medical waste. The preferred means of accumulating the ground waste is in containers which are leak proof and can be sealed. The sealed containers can then be disposed as normal municipal waste. The carrier fluid may be recycled back to the dispersion grinder for reuse in processing future batches. A simpler system utilizing an in-line grinder 12 may be utilized for certain waste systems as illustrated in FIGS. 1–4.

A medical waste processing system as illustrated in FIG. 5 can be used in several ways. First, the unit can be produced in a compact and inexpensive form so that any hospital or medical facility would have the option of processing their own medical waste. Secondly, a larger system such as that shown in FIG. 12 or 15 could be built to serve a particular region. With this mode of operation, the medical waste would first be collected and then it would be transported to the regional facility for final processing and disposal. The system 200 could also be built as a mobile system which would travel to hospitals and medical facilities periodically. The mobile unit would process the medical waste accumulated and then move to the next facility until all facilities on the route had been covered. Then the cycle would be repeated. At each location, the processed waste could be disposed in the facility's own trash bin. Finally, the system would drastically reduce the volume occupied by medical waste so that it could improve the economics of incineration, collection, and disposal. The incineration collection truck would be capable of carrying much more material before returning to the incinerator so that fewer collection routes would be needed to serve an area.

Today, municipal waste is mostly collected and landfilled as a means of handling the waste stream. Some old landfills are being tapped as a source of methane gas, which is a natural by-product from the decomposition of the municipal waste in the landfill. The municipal waste processing system envisioned in this document would make it possible to divert the municipal waste currently landfilled to a more beneficial use such as a fuel product for industrial furnaces, or feedstock for other chemical and biological processes which would convert the organic material in the waste stream to methanol or alcohol, depending upon the treatment method. The systems discussed herein are capable of processing biomass waste having high cellulose content for the conversion into sugar and alcohol. The material can also be thermally decomposed or pyrolyzed to produce methane gas and carbon black as the commercial products. In all cases, the key to success lies in the ability to economically grind large tonnage of the material into fine particle sizing so that the subsequent treatment processes can operate at high conversion efficiency in a short period of time. Particle sizing is one of the most significant factors effecting the reaction time and conversion efficiency in most processes associated with conversion of municipal waste and biomass to other beneficial products.

Finally, the steel industry recycles huge quantities of junk vehicles and other non-ferrous materials in the production of steel. In this case, a steel mill would first shred the junk vehicles and associated materials. Afterwards, the ferrous metal is separated from the shredded material and melted down to make new steel. All remaining materials, left after the ferrous metal is separated, called shredder residue or fluff, comprising various plastics, textiles, wood, and rubber as well as nonferrous metals such as stainless steel, copper, brass, and bronze must be processed and sorted. A small percentage of ferrous metals would also be imbedded in the shredded material which could not be removed by conventional initial metal separation steps. This shredder residue provides a source for a wide variety of materials. The non-metal portion of the stream has an average BTU value of approximately 14,000 BTU/LB. This means that the material would provide a huge source of fuel after removal of all metals in the stream. Individual components of the stream such as tire rubber and foam rubber can be removed from the stream using a media separation technique which accomplishes a separation based upon the density of the material. The separated tire rubber can easily be granulated by the size reduction system described herein to produce a product having a value of $300 to $600 per ton, depending upon the particle size produced. The foam rubber reclaimed from the stream can be depolymerized and used as a feedstock for making more foam rubber. Various metals reclaimed from the material have considerable recycle value as well. Finally the non-metal portion of the stream can be converted to methane gas using the appropriate biological or chemical process. The material can also be thermally decomposed or pyrolyzed to produce methane gas and carbon black as the commercial products.

The first stage of a municipal waste and biomass processing system based on the principles illustrated herein in the FIGS. 1–15 would be a shredding system 62 which would reduce the particle size of the infeed material to a maximum size of 6" diameter. The shredded material would then be routed through a metal removal system as illustrated by FIG. 15, prior to entry into the dispersion grinder system 82. The metal removal system can be configured to remove both ferrous and non-ferrous metals. Ferrous metals may be removed using a magnetic drum such as illustrated in my previous patents and applications while non-ferrous metals may be removed by an eddy current separator 202. An alternate means of removing metal and higher density materials from the infeed would be to utilize a media separation system. A media separation system utilizes high density fluids to cause materials to float at specified densities, thereby providing a separation means. By using separation media having a density of 1.5 to 2.0 most all beneficial waste material, (including plastics, paper, rubber, vegetation, etc.), can be made to float while all material more dense will sink. This method would separate all glass, sand, and clay from the waste as well as all free metal.

After the metal separation step, the waste is delivered to a dispersion grinder 82 where it is united with a suitable dispersion fluid such as water. The unit grinds the material into a coarse dispersion having solids as large as ⅛" to ¼". After this step, any metals which were previously imbedded into the waste material can easily be separated. This separation can be accomplished utilizing the internal magnetic separation system 162 illustrated in FIG. 14 or a hydrocyclone or centrifuge 204 seen in FIG. 15 both of which use the difference in density of material to accomplish the separation. A hydrocyclone is the preferred separation means because it is less expensive, it is more economical to operate and it can be tailored to separate at any desired density, thereby accomplishing a selective separation. This separation step would also remove any ground glass, sand, and clay from the waste material so that a refined stream can then be delivered to the disk attrition mill, in-line grinder 12. After fine grinding, the material is delivered to a solids separation system 22 such as a shaker screen, screw press, or centrifuge to recover the solids. The liquid carrier can then be selectively returned to the dispersion grinder tank 88 to carry more solids through the system. The recovered solids can then be converted to a fuel product by extruding through a pelletizer or cuber 208, or the material can be routed to another process step such as a pyrolyzer. Some processes may not require the separation of the ground solids from the liquids. In this case, the ground mixture leaving the disk attrition mill can be delivered to the next process step such as a biological reactor or chemical reactor. The system described above can easily be built as a mobile unit so that it may serve a variety of locations.

Future evolution of this technology may result in the treatment of municipal waste by way of the sewage treatment systems, so that organic solids can be removed and converted to beneficial use at the treatment plants.

It is a common practice to day to use bar screens and other screening devises to remove unwanted solids from the infeed stream to sewage treatment facilities. This is done to insure that down stream pumps, piping, aerators, and other equipment is not clogged with the course solids. Also, solids such as plastic, rubber, glass and metal are not good candidates for biological reduction by the treatment plant. Therefore, every precaution is taken to remove such items before they enter the treatment process. Today the coarse solids are typically collected and disposed of in a solid waste landfill. However, it is becoming increasingly important to process the coarse solids into a form that is not recognizable as to its source. For this reason solids grinding devices are used to grind the coarse solids into an unrecognizable form as well as to reduce the particle size thereby increasing the bulk density thus improving the economics of handling and transporting the material to a landfill. In a like manner size reduction systems as taught herein and illustrated in FIGS. 1–15 are be used to process coarse solids. In some cases it is desirable to recover such solids for disposal in a landfill. However, it is now possible to size the coarse solids to such a fine state that they may be processed through the biological treatment system where the biological process is accelerated due to the small particle size reduction of the solids.

Likewise, tree and bush trimmings, leaves, as well as other organic yard wastes are typically collected separately by most municipalities. This material is typically collected and then delivered to a central processing location where the material is shredded into coarse chips. A tub grinder is typically the preferred machine to accomplish this shredding step, but other machines such as hammer mills are also satisfactory. The resulting shredded yard waste chips are used for ground cover or else land-filled. The municipal waste size reduction system 200 described herein is equally capable of accepting this pre-shredded yard waste and further grinding to a fine particle size. The advantages of this additional processing are significant. First, by grinding the yard waste to a fine particle size, the length of time required for the material to decompose into compost is greatly accelerated. This means the yard waste operation would become a valuable source of rich top soil thereby negating the need to landfill the material. Secondly, by grinding the yard waste with the municipal waste, the resulting organic material could easily be pelletized to form a commercial fuel product; be fed as a slurry to other biological or chemical processes to convert the organics to methane; or else the material could by pyrolyzed to yield methane and carbon black.

An optional system for handling municipal waste can be accomplished at any residential or industrial site that is connected to a sewage collection system. With this approach, each individual location would be equipped with a dispersion appliance capable of accepting municipal waste, exclusive of glass and metal. Once the dispersion vessel 166, is filled with waste, then the dispersion system would automatically fill with water (either fresh water or collected waste water from kitchen drains, etc.) and proceed to grind the contents. Afterwards, the appliance would discharge its ground contents into the sewage collection system where it would freely flow to the sewage treatment plant.

At the sewage treatment plant, solids can be processed through the conventional waste treatment system, or they can be removed from the stream and be treated separately through a biological reactor, chemical reactor, or pyrolysis system. In any case, the net result of the appliance approach to municipal waste business would be to eliminate the cost of collecting the waste and transporting bulk quantities of the material to a landfill. The cost and liability of land-filling the material would also be eliminated. Finally, the organic solids collected and routed to a central location provides the unique opportunity to convert the materials to beneficial use that otherwise would have been more costly to accomplish.

In the pulp and paper industry, waste paper is typically converted back into pulp using a hydrapulper system. The system is typically composed of a hydrapulper connected in series with a double disk refiner through a transfer pump. The hydrapulper is typically a large open topped vessel having a rotating impeller in its bottom portion driven by 500 to 1000 horsepower motor. The hydrapulper is usually equipped with devices to remove unwanted waste materials such as rags and steel. The double disk refiner is a device having a grooved stator and rotor arrangement inside a casing typically driven by a 250 to 500 HP motor. The stator and rotor run in close proximity to one another and pulp is further broken into individual fibers as it passes radially through the gap between the stator and rotor. The transfer pump between the hydrapulper and refiner would typically require an additional 50 to 75 HP. The total horsepower requirement for a typical hydrapulper process producing 250 tons per day of pulp would thus be in the range of 800 to 1575 HP In operation, the hydrapulper is partially filled with water and the machine is started. Afterwards, bales of waste paper are dropped into the hydrapulper by a fork lift operator. After a suitable period of time, the machine is able to pulp the waste paper while the unwanted wastes such as rags and bale bands are removed. Afterwards, the finished batch is pumped through the double disk refiner. The refiner completes the task of separating individual fibers in the pulp stream. Afterwards, the refined pulp is routed to the remainder of the paper making process.

In like manner, the multishear dispersion grinder used in series with a shredding means. as illustrated in FIG. 8, can continuously accomplish the same goal as the hydrapulper system using ½ to ⅓ of the horsepower. The shredding means is preferably the rotary shredder 62 referenced throughout the several figures illustrated herein. It would typically be driven by a 200 HP motor. The dispersion grinder would also typically be driven by a 200 HP drive so that the total power demanded by the system to accomplish the same production rate would require approximately 400 HP. In operation, bales of waste paper would first be delivered to the shredder system 62 by conveyor or the forklift operator. The shredder would be directly linked to the dispersion grinder system 82 so that it could continuously deliver shredded paper to the unit containment tank 156 having a maximum particle size of 6". The dispersion grinder 88 would continuously unite the shredded paper with a continuous stream of water entering the dispersion grinder vessel. It would be equipped with the typical waste removal system such as a ragger and junk outlet to remove non-paper waste. The action of the dispersion unit rotor would provide vigorous circulation of the mixture in the vessel thereby breaking the paper down further. Finally, the paper particles would be drawn into the attrition zone located beneath the dispersion grinder 82 to provide a final separation of the paper fibers from one another. The pulp discharged from the dispersion grinder would be ready for further processing into a finished paper product. The attrition zone in the dispersion grinder can be equipped with a wide variety of stator and rotor designs all of which are uniquely controlled by variable displacement stator and rotor relationships. One option uses intermeshing teeth to shear the paper fibers while other options use grooved refiner plates to accomplish the same task. Steam and other chemicals can also be introduced into the dispersion vessel or attrition zone to further enhance the properties of the pulp.

Batch digestion of wood chips in the pulp and paper industry involves the screening of the resulting pulp to remove all wood knots that are not broken down in the digestion process. In the past, these knots have been rejected from the process as waste. Experience has shown that the knot rejects from the screening process can be converted to pulp by the disk attrition mill, in-line grinder 12. This step results in significant savings on the avoided cost of disposing of the knots as well as the enhanced value of converting the knots into valuable paper pulp. A typical system may be configured as illustrated in FIGS. 1–4 is composed of a receiving tank to accept the rejected knots from the screens as seen in FIGS. 1, 2 & 4. Makeup water is added to the tank 88 to form a slurry with the knots. The resulting mixture is then pumped through the disk attrition mill and into a discharge tank. Afterwards, the ground material is routed through a pressure screen to remove any shives (pieces of wood) from the pulp. The accepted pulp is then routed to the paper making process while the shives are either routed back to the digester or else collected for disposal. An alternative to this arrangement would include a second disk attrition mill 12 to process the slivers rejected from the pressure screen. The disk attrition mill would be configured to yield a fine grind so that the rejected shives could be further reduced into acceptable pulp. In this case, the processed shives would be returned to the pressure screen for elimination of any unpulped shives. It should be noted that since the disk attrition mills discussed herein are equipped with variable displacement stator/rotors there is no need for a series of cascading mills. One mill can be set for any size reduction desired.

Finally, chemical pulping of paper avoids the use of digesters altogether. Instead, the process uses stone rolls to grind wood logs into a paste type consistency which is then routed through refiners in the presence of steam and chemicals to further reduce the wood to pulp fibers. The paper produced by this process is typically used as newspaper print. One of the major problems associated with chemical pulping is the wear and breakage of the grinding stones. Broken grinding stones tend to destroy downstream equipment. Also, the process produces wood slivers and log end pieces that must be separated and processed separately. As an alternative, the dispersion mill grinder 82 and the in-line grinder 12 both have the ability to grind wood chips into paper pulp. With this approach, chipped wood is simply fed into either machine together with appropriate amounts of chemicals and steam to produce a useable paper pulp.

As discussed in detail in my earlier patent application 09/023,051 and incorporated herein by reference I described a drill cutting processing system utilizing an in-line grinder 12, as the principle grinding apparatus in the system. Experience has found that the multishear dispersion grinder 82 is equally capable of accepting a slurry of drill cuttings in water and grinding the material into a fine particle size without the need for extensive auxiliary equipment. The preferred stator/rotor combination for the machine's attrition zone is the non-intermeshing configuration which is hard surfaced with tungsten carbide or synthetic diamond which crushes the drill cuttings and grinds them to a micron particle size. With this configuration, the particle size produced is regulated by controlling the gap between the stator and rotor. Obviously the wider the gap, the larger the particle size produced.

As a matter of background, a wellbore is formed in a generally conventional manner by providing a wellhead for supporting a casing string which extends within the wellbore. A drive pipe extends into the formation in support of the wellhead. Cement occupies the annular space between the drive pipe and the casing as well as an annular area between the formation and the casing. A secondary casing or protection pipe extends from the wellhead into the formation and is cemented at a zone which has been packed with cement and which leaves an annular area or space between the cement and the casing which is delimited by the formation and the protection pipe. A drill stem typically extends through the wellhead, the casing and the protection pipe to an open hole bottom portion of the well-bore. In accordance with conventional drilling practice, drilling fluid is circulated from a source down through the drill stem and up through the annular area formed between the drill stem and the pipe to a return receptacle or bell nipple. The drilling fluid returning through the annulus carries with it the earth particles or drill cuttings which, upon return to the surface, are conducted by way of a conduit to a separating device commonly known as a shale shaker. Drill cuttings which are too large to be included in the drilling fluid for recirculation into the wellbore are separated by the shale shaker and conducted by suitable conduit means to a unique system for treating and disposing of the drill cuttings in accordance with the present invention.

Drilling fluid and finer drill cuttings particles not separated by the shale shaker are collected in a mud tank and processed in accordance with conventional practices before reinjection of the drilling fluid down through the drill stem. Smaller drill cuttings not separated by the shale shaker may be separated in conventional desanders and added to a slurry to be described herein.

Figure 16:
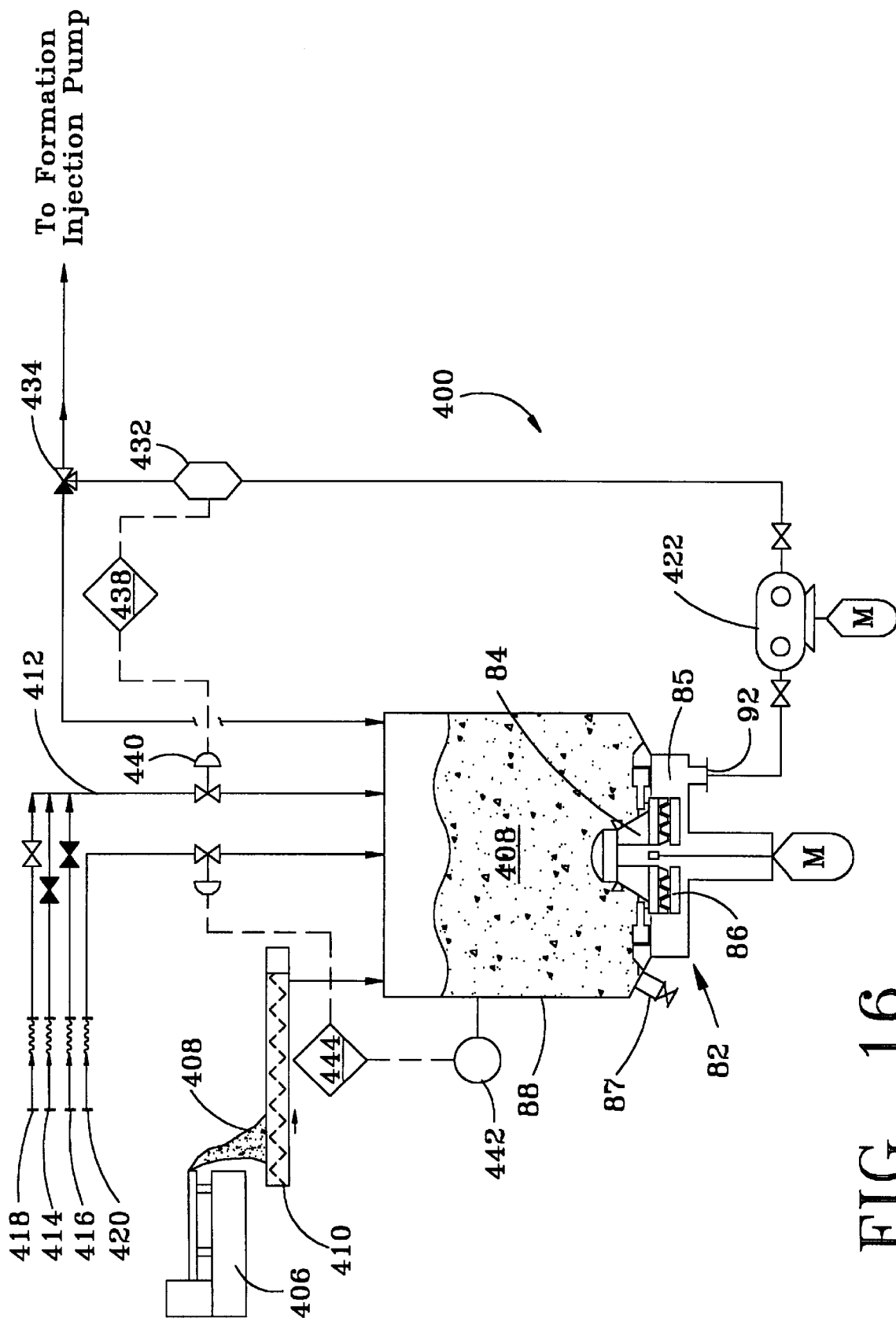
FIG. 16 is a schematic diagram of an automated dispersion and inline grinder system.

In accordance with the present invention, a unique system is provided for processing the separated drill cuttings into a homogenous mix prior to injection into the earth formation. FIG. 16 illustrates a configuration of the system 400 in schematic form. The system 400 includes a multishear dispersion grinder 82. The dispersion grinder 82 is in fluid communication with a shale shaker 406, usually located on the drilling platform producing the drill cuttings 408, by way of a conveyor 410 for receiving drill cuttings 408 from the shale shaker 406. The dispersion grinder 82 is also in fluid communication with a conduit 412 which is connected to a source of slurry carrier liquid, which may be sea water 414, fresh water 416, or waste water 418 from the platform's sewage treatment system. A separate viscosity enhancing polymer line 420 is also routed to the dispersion grinder 82. The system 400 also includes one or more transfer pumps 422 which are in fluid communication with the dispersion grinder 82 by way of suction lines 92. Positioned in the bottom of the dispersion grinder is a means of removing tramp metal and other unprocessable items, known as junk outlet 87. The transfer pump(s) 422 delivers the drill cuttings slurry via a high pressure pump (usually a positive displacement pump) for injection into the formation. Valves 434 are provided for directing the sized cuttings either directly to the injection pump or back into the dispersion grinder 82. This option allows the system to be operated in a continuous fashion, in a batch mode, or a hybrid mode. In the continuous mode, drill cuttings 408 are continuously received, sized, conditioned, and delivered to the injection pump. In the batch mode, drill cuttings are received on an intermittent basis and recirculated through the dispersion grinder 82 until a tank size quantity of material is properly sized and conditioned. Afterwards, it is directed to the injection pump. Finally, the hybrid mode involves the continuous receipt of drill cuttings and the recirculation of those drill cuttings through the dispersion grinder 82 and back into the tank 88. A side stream is continuously extracted from the discharge of the in-line grinder 430 and it is routed to the injection pump.

The sized solids leaving the dispersion grinder 82 are suitable for routing through a mass flow meter 432 for the purpose of generating a signal proportional to the density of the slurry 408. This signal is input into a process controller 438 which modulates the flow of water into the grinder tank through a control valve 440 installed on the water input line 412 to the tank 402. This control loop provides a continuous means of delivering a constant density slurry to the formation. Further, the dispersion grinder 82 is equipped with a viscosity transmitter 442 which produces a signal proportional to the viscosity of the slurry 436. This signal is input into a process controller 444 which modulates the flow of viscosity enhancing polymer 420 into the dispersion tank 88. The net result of the viscosity and density control systems is to deliver a sized slurry to the formation which has consistent and ideal properties for effective migration throughout the formation without plugging it.

Figure 17:
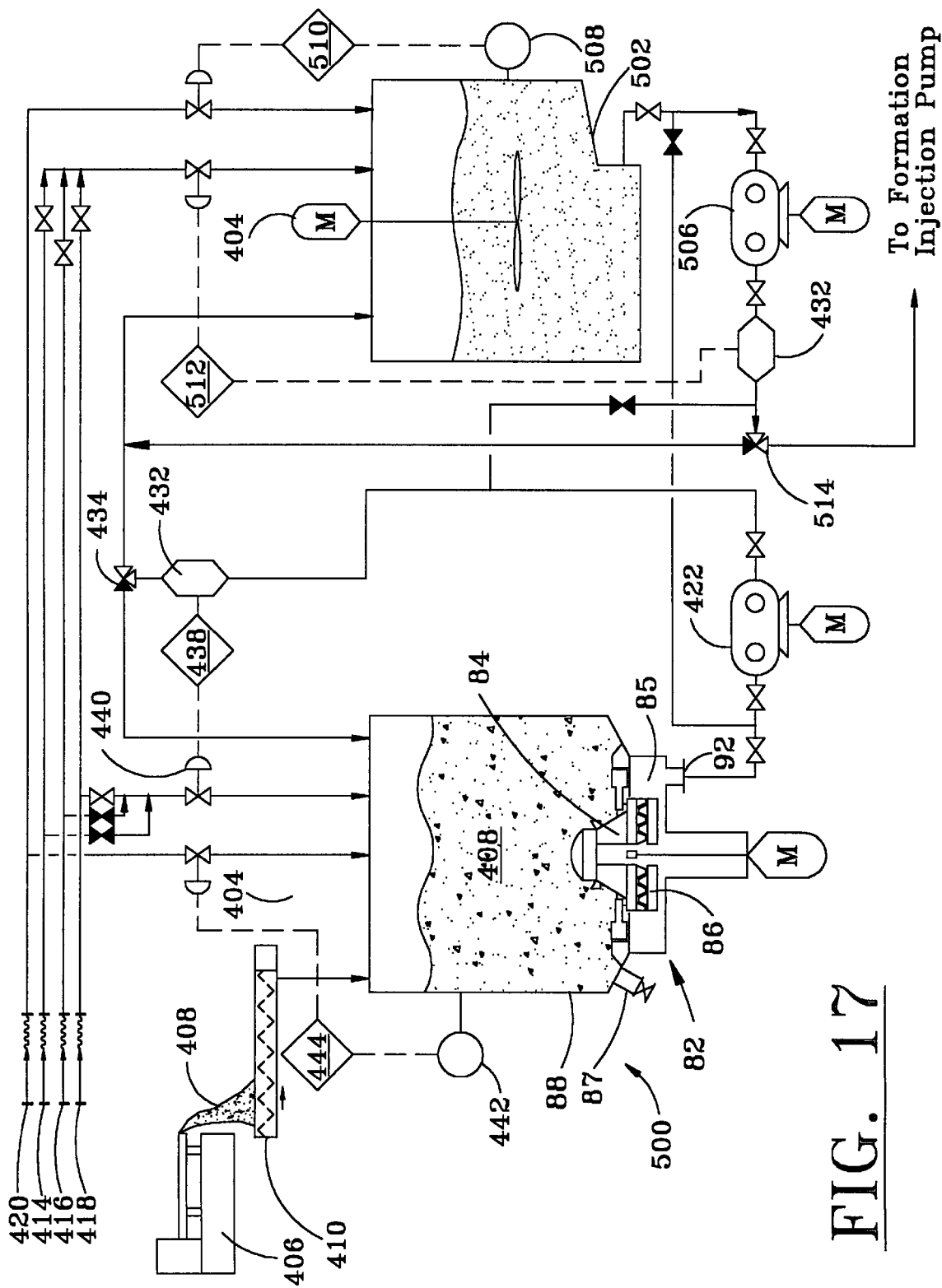
FIG. 17 is a schematic diagram of an automated dispersion and inline grinder system for drill cuttings injection.

FIG. 17 illustrates the preferred embodiment of the drill cuttings processing system. It features a slurry system 500 comprising a dispersion grinder 82, transfer pump(s) 422, 506, piping, and instrumentation as outlined above. The system additionally comprises an injection system which receives the sized and conditioned drill cuttings from the slurry system. The injection system comprises an agitated injection tank 502, as well as one or more transfer pumps 506, piping, and instrumentation. The transfer pump 506 takes processed cuttings slurry 504 from the injection tank 502 and directs it to the injection pump; recirculates it back to the injection tank 502; or directs it to the dispersion tank 88. Also piping interconnections are provided between the dispersion grinder transfer pump(s) 422, and the injection tank transfer pump(s) 506 so that each may operate from either tank, thereby increasing the versatility of the system. The injection tank 502 is also equipped with a fine viscosity transmitter 508 which delivers its signal to a fine viscosity controller 510. The viscosity controller 510 modulates the flow of viscosity enhancing polymers 420 into the injection tank 502. In like manner, the injection tank transfer pump 506 routes its flow through a second mass flow meter 432 for the purpose of generating a signal proportional to the density of the cuttings slurry 504. A fine density controller 512 receives the signal from the mass flow meter 432 and modulates the flow of dilution water 414–118 into the injection tank 502.

In normal operation, drill cuttings 408 are continuously sized and conditioned by the slurry system 500 and held in the injection tank 502 for injection. The density and viscosity adjustments made to the drill cuttings in dispersion grinder 82 is generally coarse in nature due to the variations in drill cuttings delivered to the system. The injection tank 502, being equipped identically as the dispersion grinder 82, has the ability to make fine adjustments to the properties of the drill cutting slurry 504 before injection into the formation by the injection pump. Therefore, the consistency and quality of the drill cuttings may be improved through the use of this automatic dual adjustment system 500. Flow control of cuttings to the formation may be regulated through variable speed control of the injection pump or through the use of a control valve 514 to bypass excess flow back to the injection tank.

The size reduction systems discussed herein are also applicable to the processing of sugar. The typical process for producing sugar from cane involves the harvesting of the cane and the transport of the cane to a local sugar mill where the conversion of the cane to sugar takes place. The typical method of harvesting involves cutting the cane and then stacking it in rows. After drying, the rows are burned to eliminate all of the foliage from the cane, leaving the cane stalks bare. The stalks are loaded onto trucks and are then carried to the mill. During the cane cutting season, each mill receives thousands of truck loads of cane. It is known that the sugar content of the cane begins to decline immediately after cutting, so it is very important to deliver the cane to the mill promptly to preserve the sugar content of the cane. Today, a new harvesting method is gaining favor in the industry. With this approach, a mechanized harvesting machine cuts the cane; strips off the foliage; chops the cane into segments; and deposits them into a collection bin. The collection bins then fill a truck for transport to the mill. The advantage of this method of harvesting is to eliminate the need to burn the cane and to eliminate the need for drying the cane in the field. The major disadvantage of this method lies in the accelerated degradation of the sugar content of the cane.

The typical mill that processes cane begins the conversion to sugar by first washing the cane to remove as much dirt and foreign material as possible. Next, the cane is typically sized by a hammermill shredder and afterwards, the material is routed through a series of press rolls to extract the sugar juice from the cane. The cane solids leaving the press rolls is a cellulosic material called bagasse. It is typically used as fuel by the mill, but it also can be converted to sugar or alcohol through further processing. The sugar juice leaving the press rolls is collected and routed to the clarification system where it is filtered to remove any impurities. Afterwards, the juice is concentrated into a syrup called massecuite by evaporators which drive off most of the water from the juice. The concentration step is taken to the point where the syrup is super saturated with sugar and a driving force exists for the crystallization of the sugar from solution. Finally, the massecuite is fed to basket centrifuges where the sugar crystals are separated from the syrup. The concentration and centrifugation steps are repeated one to two times to maximize the yield of sugar crystals. The dark brown syrup left over after all crystallization has taken place is called black strap molasses.

In similar fashion, sugar beet sources provide roughly 50% of the sugar in the U.S. In this process, the sugar beet roots are harvested from the fields and the green vegetation on top of the beet is cut off and used as animal feed. The roots are trucked to the mill where they are first washed and then cut into slices. The sliced beets are mixed with hot water and held in extraction tanks until the sugar is liberated from the plant. The solid beet pulp leaving the tanks is separated from the sugar juice and is used as animal feed. The sugar juice is then treated through the same type of clarification, concentration, and centrifugation steps outlined above for sugar cane processing.

The multishear size reduction system as taught herein can have important applications in the sugar industry for processing both cane and sugar beets. In the processing of sugar beets, The size reduction equipment has the ability to reduce the sugar beets to a finely ground pulp prior to entry into the extraction tanks. This finely ground pulp would liberate its sugar content quickly and it would require less diluent hot water to succeed in the extraction. The net result of the addition of the size reduction equipment to the sugar beet process would be to increase the plant's capacity by speeding up the extraction step; improving the sugar yield from the beets; and reducing the amount of water that must be evaporation from the syrup before crystallization can occur. The option exists for use of a dispersion grinder or disk attrition mill as the grinding apparatus prior to the extraction tank, but the alternative also exists for installing a disperser head in each of the extraction tanks so that the size reduction of the sliced beets takes place inside the extraction tanks.

The size reduction system can also be used to improve the efficiency of harvesting and processing sugar cane. The preferred configuration of the multishear size reduction system as taught herein could be portable would be used in conjunction with harvesting equipment to crush and extract sugar juice from the cane on the crop site rather than at the sugar mill. This provides for the efficient transport of sugar juice to the mill in lieu of transporting the bulky sugar cane stalks. The resulting bagasse leaving the size reduction system could be discarded on site for mulching into the soil or else it could be further processed into sugar through additional biological and chemical processes. The preferred embodiment of a cane processing system is illustrate in FIG. 11. In which case the mass would be drastically reduced for transport. The first stage of the preferred embodiment of the sugar cane processing system would include a multishear rotary shear shredder 62 mounted on a mobile trailer having a knuckle boom loader. With this arrangement, the loader would be capable of picking up and feeding cane stalks into the shredder regardless of whether it was whole stalks or segmented stalks. The second stage of the preferred system would utilize a multishear dispersion grinder system 82 mounted on a mobile trailer together with a solids recovery system 22 such as a screw press. The mobile trailer could also include one or two disk attrition mills 12 to provide an even finer grind to the cane. A screw press would be the final element in the mobile system. With this arrangement, 10 to 30 tons per hour of cane could be loaded into the shredder 62 which would then discharge the cane into the dispersion grinder 82. The dispersion grinder would use a minimum amount of sugar juice thus reducing the water content to slurry the incoming cane so that it could then be further reduce on the top side of the unit's rotor and then be routed to the attrition zone beneath the rotor for even finer reduction. Afterwards, the ground cane could be routed to one or more disk attrition mills 12 for finer particle sizing before it would finally be discharged into the screw press. The screw press would squeeze the sugar juice from the cane and discharge ground bagasse as a sold. The extracted sugar juice would be routed to a mobile holding tank awaiting transport to the mill. Through the use of this mobile system, the transport cost of making sugar would be reduced. Also, processing of the cane at the crop site eliminates the loss of sugar content in the cane due to degradation after cutting.

Rendering plants process animal intestines, bones, and other inedible animal remains to produce valuable commercial products such as cosmetics, glue, animal feed, and gelatin. Glue and gelatin are produced from animal bones, for example. Cosmetics are made from the oils and fats extracted form the material while high protein animal feed is made by cooking and drying the tissue material. In most of these processes, it is necessary to grind the animal remains before further processing can take place. The multishear size reduction equipment taught herein is capable of grinding any of these materials to a micron particle size if necessary. For this reason, it is envisioned that the equipment will find important uses in the industry in replacement of existing grinding equipment. Also, the disposal of poultry carcasses and feathers is a particular problem due to the great bulk of the feathers. Both the multishear dispersion grinder 82 and the disk attrition mill 12 can easily reduce these feathers to a compact size for further use or disposal prior to hydolization with any of the systems illustrated in FIGS. 1–15.

Statistics indicate that in excess of 250 million tires are discarded in the U.S. each year. As many as ten times this number are believed to be stockpiled on the land. Most every state in the U.S. now operates a waste tire program aimed at the regulation of the waste tire industry as well as the cleanup of their state's promiscuous tire piles. The recycling of waste tires has found many applications. These include: using shredded tires to cap landfills, using shredded and whole tires as fuel for industrial furnaces, using coarse granulated tires for playground covers, mats, and other safety applications; using whole tires as artificial reefs and tide breaks; as well as granulating rubber to a sufficiently fine particle size so that it can be used to rubberize asphalt pavement as well as be used as an additive in plastics extrusions. The value of tire derive fuel ranges from $20 to $25 per ton for a 2" nominal chip. In comparison, the value of granulated rubber ranges from $200 to $300 per ton for ¼" to ⅛" chips to approximately $500 to $700 per ton for 400 mesh granules. Obviously, the opportunity for making and selling granulated rubber is far more attractive than selling rubber chips as a fuel. However, the demand for granulated rubber has been suppressed due to the high cost of producing it coupled with the inconsistency in quality and availability of the material. In the United States today, the total annual production of granulated rubber is approximately 100,000 tons. The cost of synthetic rubber today is approximately $1,400 per ton, but the price is expected to rise to $2,000 within the next 3 to 4 years. Tire manufacturers have already begun using granulated rubber in their products. At least one major tire manufacturers has announced the intent to include 10% crumb rubber in their tires. If all tire manufacturers follow suit, then an additional 356,000 tons of granulated rubber would be required to suit the demand by tire manufacturers in the United States alone. The increasing demand for granulated rubber extrusions with plastics together with the increasing demand for rubberized asphalt will see the market for granulated rubber grow in the foreseeable future.

The major reason that the granulated rubber market has not developed in the United States is due to the current high cost of producing the product. Today, there are predominantly two methods for producing granulated rubber. They include the cryogenic process and the ambient process. The cryogenic process begins by shredding whole tires into chips using one or more shear shredders. Afterwards, the chips are fed into a cryogenic tunnel where they are submerged in liquid nitrogen. The nitrogen continuously evaporates and must be replenished. The cryogenic fluid freezes the rubber chips so that they become very brittle. Afterwards, they are fed into a hammermill shredder where they are shattered into pebble sized rubber. Several subsequent cryogenic treatments allow the rubber granules to be ground finer in granulation machines so that the end product can be as fine as 400 mesh. At each stage of the process, steel and fiber belting are removed using magnetic drums for the steel and air flotation for the fiber. The greatest cost factors associated with the cryogenic system is the cost of cryogenic fluid and the high cost of maintaining the equipment.

The ambient process typically uses several shredding stages to reduce whole tires to 1" to 2" chips. Afterwards, the chips are fed into a series of granulators, each of which produces a finer grind than the one before. Steel freed in each previous stage is removed by magnetics before entering the next stage. Also, air is used to convey granules from one stage to the next, thereby providing the opportunity to remove the liberated fiber from the stream. The major factors associated with the ambient approach include the high capital cost of equipment, high operating and maintenance cost, significant risk of fire because of the air conveyance through the grinding stages, and the size limitation of approximately 100 mesh possible with ambient granulators. The multishear size reduction system taught herein will have a significant impact upon the production of granulated rubber because the compact system can be sized to economically process 10 to 20 tons per hour of tires to produce granulated rubber as fine as 400 mesh without the need for expensive cryogenics and high maintenance costs associated with previous systems. Further, the system uses a fluid carrier to convey the rubber through the system thereby cooling and minimizing wear on the grinding components as well as insuring that the process is safe from the possibility of fire. Further, the system can easily utilize plasticizers, and other polymers that enhance the properties of the granulated rubber as the fluid carrier in the system. Finally, the system can easily be built as a mobile system so that granulation can be done at any site, thereby minimizing handling and transportation cost of the tires. The preferred embodiment of the system may be configured according to FIGS. 11 or 14 utilizes a multishear rotary shear shredder 62 as the first size reduction stage. The typical tire rotary shredder is capable of reducing 10 to 20 tons per hour of whole tires to 1½ "chips in a single pass. Further, the shredder utilizes interchangeable tungsten carbide wear components which can be easily replaced without costly shutdowns and which greatly extends their useable life, thereby reducing maintenance costs. After shredding, the tire chips are then conveyed into the variable displacement multishear dispersion grinder 82 where they are united with a suitable carrier fluid and ground to a ⅛" to ¼" particle size. Afterwards, the mixture is pumped through a series of density tuned hydrocyclones 204 to separate the free metal and fiber from the stream. Then the mixture can be delivered to the variable displacement disk attrition mill 12 to further grind the rubber as fine as 400 mesh, depending upon the stator/rotor configuration. The ground mixture is then delivered over a magnetic drum separator well known within the art to remove any remaining free metal. Afterwards, the mixture is allowed to flow onto an oscillating screen also well known where the rubber is separated from the fluid. The oscillating screen may be equipped with several screens having increasingly finer meshes so that various grades of granulated rubber can be easily separated at this stage. The fluid leaving the oscillating screen separation system 22 is returned to the dispersion grinder for use in carrying more rubber through the system. The rubber leaving the system would be at an elevated temperature in the range of 120 to 200 degrees F. due to the mechanical energy delivered to the material by the grinding units. The rubber would therefore dry naturally from evaporation without the need for a dryer. For Facilities which already have 1–2 inch tire chippers, a simpler processing system maybe configured according to FIGS. 1–4 which utilizes a multishearing in-line grinder to reduce the chips to granulated rubber.

U.S. Pat. No. 5,586,729 entitled "Fuels Blending System and Method of Using" together with U.S. Pat. No. 5,495,986 entitled "Method for Providing a Fuel Mixture" are issued to the present inventor and referenced in this document. The two patents illustrate the principles of the attrition technology embodied in the design of the multishear dispersion grinder 82 as well as that of the disk attrition mill in-line grinder 12. The patents further illustrate the use of this technology in the processing of hazardous waste to produce a blended fuel mixture. Improvements and alternate configurations of the technology are presented in a patent application entitled "Fuels Blending System". Finally, additional improvements and configurations of the attrition technology are presented in a patent application entitled "Rotary Grinder". Collectively, the patents illustrate the ability of the multishear dispersion grinder and the multishear in-line grinder to process a wide variety of solids not associated with the fuels blending industry. The adjustable variable displacement stator/rotor gives the operator control over the amount of size reduction occurring at any given time as well as enabling him to compensate for any wear of the grinder's attrition teeth. My "Rotary Grinder" application 09/023,051 particularly illustrates the use of an adjustable rotor having a number of stator-rotor combinations which interchangeably mount in the in-line grinder machine to accomplish a wide variety of size reduction needs. In like manner, the same principles can be applied to the attrition zone found in the multi-shear dispersion grinder to adapt the machine to a wide variety of process applications.

The configuration and uses of an interchangeable attrition zone with in each of the grinders having multiple stages of intermeshing teeth have already been discussed in the previous patents and applications referenced herein. As previously discussed in these previous applications experience has found that the performance of the dispersion grinder is enhance through the use of a fine grind ring used in conjunction with the intermeshing teeth. With this configuration, the rotor is surrounded by a stationary fine grind ring to produce a particle size that otherwise could not have been produced by the intermeshing stages of teeth in the conventional configuration. The fine grind ring is perforated with openings which cooperate with the outer teeth stage of the rotor, thereby increasing the number of shears taking place in the machine. The greater the number of perforations in the fine grind ring, the smaller the particle size leaving the attrition zone. This feature enables the dispersion grinder to avoid the need for a secondary fine grind, although throughput of the machine may be reduced as a result. In applications involving the processing of fibrous materials such as paper pulp, a multishear grinder 82 and an inline grinder 12 stator/rotor configuration similar to a double disk refiner can be used. With this configuration, the stator and rotor do not intermesh, but rather they run in close proximity to one another. The stator/rotor both have a series of parallel grooves cut into the surface at obtuse angles to provide a multitude of channels in which a fibrous slurry may travel and be dispersed without causing undue breakage of the fiber length. Adjustment of the rotor position, controls the amount of refining taking place in the attrition zone. Injection of steam and/or chemicals may also be accomplished in the attrition zone to further prepare the fibers. Another non-intermeshing configuration of stator and rotor is especially useful in grinding solids to a micron particle size. With this arrangement, the stator and rotor form a conical grinding chamber with the highest portion of the cone positioned at the center of rotor rotation and the slope of the cone tapers to parallel stator/rotor faces around the perimeter. The conical portion of the attrition zone and the parallel portion of the attrition zone may be configured with a series of hills and valleys so that material entering the grinding chamber becomes wedged between a rotating hill and a stationary valley, thereby crushing it for further movement up the taper of the cone. The gap between the parallel faces of the attrition zone ultimately determines the particle size that can leave the grinding chamber. Adjustment of the rotor position thus allows control of the particle size produced by the configuration. This arrangement is especially useful in the processing of drill cuttings and other friable material to a micron particle size. The stator and rotor of this configuration would typically be hard surfaced with tungsten carbide or diamond chips to withstand the severe abrasion of the drill cuttings. The whole task of grinding drill cuttings is greatly simplified by equipping the multishear dispersion grinder 82 with this configuration because it eliminates the need for external tanks, piping, pumps and controls resulting in significant space savings as well as cost savings. A single dispersion grinder mounted in a vessel is all that is required to accomplish the task. The low operating speed of the dispersion grinder (in the range of 200 to 400 RPM) is an important advantage over in-line grinders (typically operating from 1200 to 1800 RPM) because the lower speeds reduce the wear of components due to abrasion thereby greatly extending the life of the components.

For applications requiring fine particle sizing of flexible material such as rubber and plastics, yet another intermeshing stator/rotor configuration can be used. This arrangement utilizes a stator having a series of concentric ring stages as disclosed in my previous application 09/023,051. Each ring stage is perforated with holes or slots to provide a shear point. The greater the number of holes and/or slots, the greater the number of shears. The rotor is configured with teeth stages that intermesh with the stator ring stages so that the individual teeth form shear points at each opening during each revolution of the rotor. This configuration provides for high energy mixing and shearing for fine grinding and dispersion of high through puts of solids.

It is therefore seen that the systems disclosed herein serve a host of widely diversified uses which may come to rely heavily on the technology disclosed in this and my previously issued patents and applications incorporated herein.

Because of the many varying and different embodiments which may be made within the scope of the inventive concept herein taught, and because many modification may be made in the embodiments herein detailed in accordance with the descriptive requirement of the law, it is to be understood that the details herein are to be interpreted as illustrative and not in any limiting sense.

What is claimed is:

1. A solids size reduction and fluidization system comprising:
   a) a solids in-feed system
   b) a means for receiving and mixing said solids with a liquid carrier; and
   c) at least one inline grinding means comprising:
      i) a casing having an interior central longitudinal bore, a grinding chamber including a discharge port attached to one end of said casing, and a means for supporting said casing;
      ii) a cover plate attachable to said casing covering said grinding chamber having an interior face and a suction port;
      iii) a stator assembly attached to said interior face;
      iv) a rotor assembly located in rotatable, parallel close proximity to said stator assembly;
      v) a quill slidable within said central longitudinal bore;
      vi) a rotor shaft attached to said rotor assembly, located within and rotatable relative to said quill;
      vii) an input shaft assembly rotatable relative to said casing said input shaft being telescopically cooperative with said rotor shaft;
      viii) a mechanical seal and thrust bearing assembly located mesial said quill and said rotor assembly and
      viii) a means for slidably positioning said quill and said mechanical seal and thrust bearing assembly.

2. The solids size reduction and fluidization system according to claim 1 wherein said system further comprises a means for separating said solids from said liquid carrier and selectively returning said liquid carrier to said means for receiving.

3. The solids size reduction and fluidization system according to claim 2 further comprising a solids pelletizing system connected to said solids separation means.

4. The solids size reduction and fluidization system according to claim 1 wherein said system further comprises a liquid supply source and a means for force feeding said solids and liquids into said in-line grinder.

5. The solids size reduction and fluidization system according to claim 1 wherein said system further includes a shredder means for pre-sizing said solids prior to entering said means for receiving and mixing said solids, said shredder comprising
   a) a housing having head and foot ends and side walls;
   b) at least one rotor assembly: comprising a shaft, and a plurality of one piece hubs removably secured in a keyed manner to said shaft; rotatably suspended between said head and foot ends, each of said hubs having means for removably attaching a plurality of wear inserts;
   c) a driver connected to said shaft; and
   d) an anvil assembly comprising:
      i) a bed plate supported by said housing;
      ii) a plurality of wear plates adjustably attached to said bed plate; and
      iii) a means for allowing said anvil bed plate to expand longitudinal from a fixed point common to a fixed point of said rotor assembly.

6. The solids size reduction and fluidization system according to claim 1 wherein said inline grinder further comprises an attrition zone, stationary and rotating disk having interchangable, segmented, intermeshing teeth.

7. The solids size reduction and fluidization system according to claim 1 wherein said means for receiving further comprising a magnetic metal separation means for collecting and removing ferrous metal.

8. A solids size reduction and fluidization system comprising:
   a) a solids in-feed system;
   b) a means for shredding said solids to a size acceptable by an in-line grinder;
   c) a means for receiving and mixing said solids with a liquid carrier;
   d) an inline grinder comprising:
      i) a casing having an interior central longitudinal bore, a grinding chamber including a discharge port attached to one end of said casing, and a means for supporting said casing;
      ii) a cover plate attachable to said casing covering said grinding chamber having an interior face and a suction port;

iii) a stator assembly attached to said interior face;
iv) a rotor assembly located in rotatable parallel close proximity to said stator assembly;
v) a quill slidable within said central longitudinal bore;
vi) a rotor shaft attached to said rotor assembly, located within and rotatable relative to said quill;
vii) an input shaft assembly rotatable relative to said casing said input shaft being telescopically cooperative with said rotor shaft;
viii) a mechanical seal and thrust bearing assembly located mesial said quill and said rotor assembly and
viii) a means for slidably positioning said quill and said mechanical seal and thrust bearing assembly; and
e) a means for separating said solids from said liquid carrier and selectively returning said liquid carrier to said receiving means.

9. A solids size reduction and fluidization system comprising:
a) a solids in-feed system;
b) a means for receiving said solids and combining said solids with a liquid carrier;
c) a variable displacement, dispersion system integral with said means for receiving comprising:
   i) a stationary, attrition plate, a rotating attrition plate attached to a rotor member thus providing an attrition zone therebetween and a plurality of descending grinding stages;
   ii) a plurality of intake vanes, attached to said rotor member, for importing, by suction, said combination liquid and solids material from said receiving means into said attrition zone;
   iii) a means attached to said rotor member for agitating said solids and liquids and further fractionating said solid materials for importing into said attrition zone;
   iv) a means for collecting and discharging said solid materials dispersed within said receiving means; and
   v) a means for rotating at least one of said attrition plates; and
d) a means for separating said solids from said liquid carrier and selectively returning said liquid carrier to said receiving means.

10. The solids size reduction and fluidization system m according to claim 9 further comprising an inline grinder having variable rotor/stator displacement connected fluidly and located intermediate to said dispersion system and said means for separating said solids from said liquids.

11. The solids size reduction and fluidization system according to claim 9 wherein said receiving means further comprising a magnetic metal separation means for collecting and removing ferrous metal from said receiving means.

12. A solids size reduction system comprising:
a) a solids in-feed system;
b) a means for receiving said solids and combining said solids with a liquid carrier;
c) a variable displacement, dispersion system integral with said means for receiving comprising:
   i) a stationary, attrition plate, a rotating attrition plate attached to a rotor member thus providing an attrition zone therebetween and a plurality of descending grinding stages;
   ii) a plurality of intake vanes, attached to said rotor member, for importing, by suction, said combination liquid and solids material from said receiving means into said attrition zone;
   iii) a means attached to said rotor member for agitating said solids and liquids and further fractionating said solid materials for importing into said attrition zone;
   iv) a means for collecting and discharging said solid materials dispersed within said receiving means; and
   v) a means for rotating at least one of said attrition plates; and
d) an inline grinder means having variable rotor/stator displacement attached fluidly to said discharge port of said dispersion system, for fine grinding and particle sizing of said solids being discharged from said dispersion system.

13. The solids size reduction and fluidization system according to claim 12 further comprising a means for separating said solids from said liquid carrier and selectively returning said liquid carrier to said receiving means.

14. The solids size reduction and fluidization system according to claim 12 wherein said means for receiving further comprising a magnetic metal separation means for collecting and removing ferrous metal from said receiving means.

15. A solids size reduction system comprising:
a) a solids in-feed system;
b) a means for receiving said solids and combining said solids with a liquid carrier;
c) a variable displacement, dispersion system integral with said means for receiving comprising:
   i) a stationary, attrition plate, a rotating attrition plate attached to a rotor member thus providing an attrition zone therebetween and a plurality of descending grinding stages;
   ii) a plurality of intake vanes, attached to said rotor member, for importing, by suction, said combination liquid and solids material from said receiving means into said attrition zone;
   iii) a means attached to said rotor member for agitating said solids and liquids and further fractionating said solid materials for importing into said attrition zone;
   iv) a means for collecting and discharging said solid materials dispersed within said receiving means; and
   v) a means for rotating at least one of said attrition plates; and
d) a shredding means for pre-sizing said solids located intermediate said solids infeed system and said means for receiving and combining liquids with solids.

16. The solids size reduction and fluidization system according to claim 15 wherein said shredding means further comprises at least one rotor assembly comprising: a shaft and plurality of one piece interchangeable hubs removably secured to said shaft, said hubs having a plurality of replaceable tooth assemblies; and an anvil assembly comprising a bed plate having replaceable anvil insert and insert holders.

17. The solids size reduction and fluidization system according to claim 15 further comprising a means for separating said solids from said liquid carrier and selectively returning said liquid carrier to said receiving means.

18. The solids size reduction and fluidization system according to claim 15 further comprising an inline grinder means having variable rotor/stator displacement attached to said discharge port of said dispersion system for fine grinding and particle sizing of solids being discharged from said dispersion system.

19. The solids size reduction and fluidization system according to claim 18 further comprising:
a) a metal separator located intermediate said shredding means and said receiving means; and
b) a hi/low density solids separator attached and fluidly connected intermediate to said discharge port of said dispersion system and said in-line grinder.

20. A system for the homogenization of a slurry of segregated drill cuttings prior to injection into an earth formation comprising:

a) a slurry tank having a discharge port;

b) a conveyance for collecting and transporting said drill cuttings from a drilling platform, to said slurry tank;

c) a fluid injection line connected to said slurry tank having at least one liquid sources;

d) a means for selectively controlling volume of said liquid entering said slurry tank;

e) a transfer pump in fluid communication with said discharge port; and f) a dispersion grinder system having an internal quill extending therefrom for variably displacing a rotor/ stator assembly integral with said slurry tank having a suction inlet in fluid communication with fluids and solids within said slurry tank, and a discharge port in conduit communication with a transfer pump.

21. A system for the homogenization of a slurry of segregated drill cuttings prior to injection into an earth formation according to claim 20 wherein said system further comprises:

a) a means for injecting enhancing polymers into said slurry tank; and b) a means for monitoring viscosity of said slurry within said slurry tank and controlling said viscosity by injecting various amounts of said polymers.

22. A system for the homogenization of a slurry of segregated drill cuttings prior to injection into an earth formation according to claim 20 wherein said system further comprises a means for monitoring mass of said slurry discharged from said dispersion grinder and automatically controlling amounts of said liquid entering said slurry tank.

23. A system for the homogenization of a slurry of segregated drill cuttings prior to injection into an earth formation according to claim 20 wherein said system further comprises a means for collecting ferrous metal, located in fluid communication with said slurry tank and dispersion grinder.

24. A system for the homogenization of a slurry of segregated drill cuttings prior to injection into an earth formation comprising:

a) a slurry tank and an injection holding tank, each having a discharge port;

b) a conveyance for collecting and transporting said drill cuttings from a drilling platform into said slurry tank;

c) a fluid injection line connected to said slurry tank and said holding tank having at least one liquid sources;

d) a means for selectively controlling volume of said liquid sources;

e) a transfer pump in fluid communication with each said discharge port; and f) a dispersion grinder having variable displacement rotor/ stator assembly integral with said slurry tank further having a suction inlet and agitation means for mixing contents of said slurry tank, said grinder being in fluid communication with at least one transfer pump.

25. A system for the homogenization of a slurry of segregated drill cuttings prior to injection into an earth formation according to claim 24 wherein said system further comprises:

a) a means for injecting enhancing polymers into said slurry tank and said holding tank; and a) a means for monitoring viscosity of said slurry within said slurry tank and holding tank and controlling said viscosity by selectively injecting various amounts of said polymers.

26. A system for the homogenization of a slurry of segregated drill cuttings prior to injection into an earth formation according to claim 24 wherein said system further comprises a means for monitoring mass of said slurry discharged from said dispersion grinder and selectively controlling amounts of water entering said slurry tank and holding tank.

27. A system for the homogenization of a slurry of segregated drill cuttings prior to injection into an earth formation according to claim 24 wherein said system further comprises a means for collecting ferrous metal in fluid communication with said dispersion grinder.

28. A portable solids reduction and fluidization system comprising:

a) a transportable solids in-feed system;

b) a transportable means for receiving and mixing said solids with a liquid carrier;

c) at least one inline grinding means comprising:

i) a casing having an interior central longitudinal bore, a grinding chamber including a discharge port attached to one end of said casing, and a means for supporting said casing;

ii) a cover plate attachable to said casing covering said grinding chamber having an interior face and a suction port;

iii) a stator assembly attached to said interior face;

iv) a rotor assembly located in rotatable, parallel close proximity to said stator assembly;

v) a quill slidable within said central longitudinal bore;

vi) a rotor shaft attached to said rotor assembly, located within and rotatable relative to said quill;

vii) an input shaft assembly rotatable relative to said casing said input shaft being telescopically cooperative with said rotor shaft;

viii) a mechanical seal and thrust bearing assembly located mesial said quill and said rotor assembly and viii) a means for slidably positioning said quill and said mechanical seal and thrust bearing assembly;

d) a means for separating ground solids from said liquid carrier and selectively returning said liquid carrier to said means for receiving in fluid communication with said means for grinding; and e) a means for collecting said ground solids.

* * * * *